US011912952B2

United States Patent
Tsujii et al.

(10) Patent No.: US 11,912,952 B2
(45) Date of Patent: Feb. 27, 2024

(54) MATERIAL AND SLIDING SYSTEM

(71) Applicants: KYOTO UNIVERSITY, Kyoto (JP); NATIONAL INSTITUTE OF TECHNOLOGY, Tokyo (JP); National University Corporation YOKOHAMA National University, Yokohama (JP)

(72) Inventors: Yoshinobu Tsujii, Kyoto (JP); Keita Sakakibara, Kyoto (JP); Takaya Sato, Yamagata (JP); Hiroyuki Arafune, Yamagata (JP); Ken Nakano, Yokohama (JP); Mayu Miyazaki, Yokohama (JP)

(73) Assignees: KYOTO UNIVERSITY, Kyoto (JP); NATIONAL INSTITUTE OF TECHNOLOGY, Tokyo (JP); NATIONAL UNIVERSITY CORPORATION YOKOHAMA NATIONAL UNIVERSITY, Kanagawa (JP)

( * ) Notice: Subject to any disclaimer, the term of this patent is extended or adjusted under 35 U.S.C. 154(b) by 0 days.

(21) Appl. No.: 17/783,164

(22) PCT Filed: Dec. 1, 2020

(86) PCT No.: PCT/JP2020/044601
§ 371 (c)(1),
(2) Date: Jun. 7, 2022

(87) PCT Pub. No.: WO2021/117538
PCT Pub. Date: Jun. 17, 2021

(65) Prior Publication Data
US 2023/0034470 A1 Feb. 2, 2023

(30) Foreign Application Priority Data
Dec. 9, 2019 (JP) .................................. 2019-222532

(51) Int. Cl.
*C10M 105/38* (2006.01)
*A46B 15/00* (2006.01)
(Continued)

(52) U.S. Cl.
CPC ........... *C10M 105/38* (2013.01); *A46B 15/00* (2013.01); *A46D 1/0207* (2013.01);
(Continued)

(58) Field of Classification Search
CPC .... C08F 120/14; C08F 292/00; C08F 220/14; C08F 2438/01; A46B 15/00;
(Continued)

(56) References Cited

U.S. PATENT DOCUMENTS

2014/0066343 A1* 3/2014 Bielecki ............... C10M 107/28
508/103

FOREIGN PATENT DOCUMENTS

JP 2008-267572 A 11/2008
JP 2014-514583 A 6/2014
(Continued)

OTHER PUBLICATIONS

International Search Report and Written Opinion dated May 17, 2022, issued in PCT/JP2020/044601.
(Continued)

*Primary Examiner* — Vishal V Vasisth
(74) *Attorney, Agent, or Firm* — BROWDY AND NEIMARK, PLLC

(57) ABSTRACT

A material comprising:
a support 10; and
a brush layer 20 containing a brush-like polymer chain assemblage 21 formed of a plurality of polymer chains and a swelling liquid 22, in which a brush layer 20 is swollen with the swelling liquid 22,
(Continued)

the brush layer 20 retaining on the surface a lubricating liquid 30, and the swelling liquid 22 contained in the brush layer 20 and the lubricating liquid 30 being phase-separated to form a liquid-liquid phase separation interface 40 in between and a sliding system using the material.

13 Claims, 7 Drawing Sheets

(51) Int. Cl.
*A46D 1/00* (2006.01)
*C08F 120/14* (2006.01)

(52) U.S. Cl.
CPC ...... *C08F 120/14* (2013.01); *A46B 2200/405* (2013.01); *C10M 2207/2835* (2013.01)

(58) Field of Classification Search
CPC .......... A46B 2200/405; C10M 105/38; C10M 2207/2835; A46D 1/0207
See application file for complete search history.

(56) References Cited

FOREIGN PATENT DOCUMENTS

| | | |
|---|---|---|
| JP | 2014-145401 A | 8/2014 |
| JP | 2014-169787 A | 9/2014 |
| JP | 2018-076536 A | 5/2018 |
| JP | 2019-065284 A | 4/2019 |
| WO | 2012-152512 A1 | 11/2012 |
| WO | 2017/171071 A1 | 10/2017 |
| WO | 2018/225693 A1 | 12/2018 |

OTHER PUBLICATIONS

Lyatskaya, Phase separation of mixed solvents within polymer brushes, Macromolecules, 1997, 30, 7588-7595.

* cited by examiner

[Fig. 1]
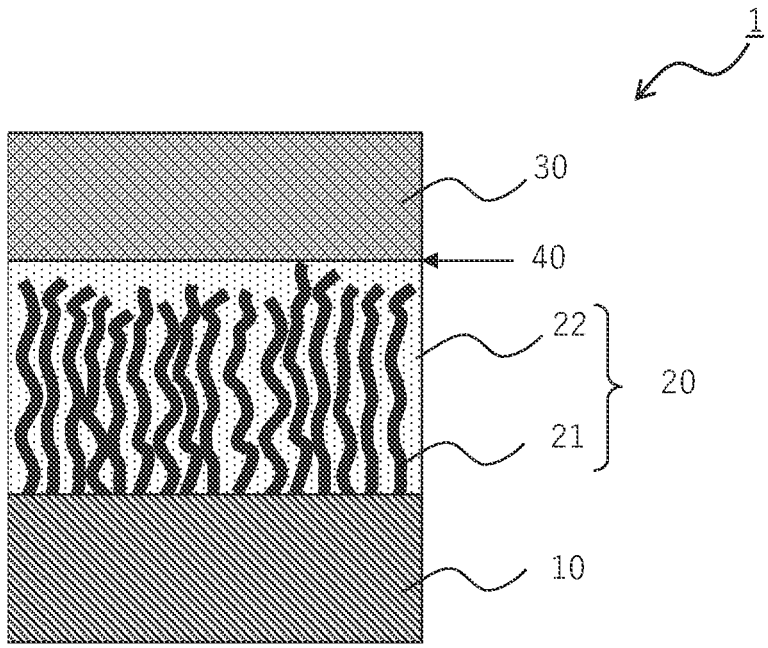
[Fig. 2]
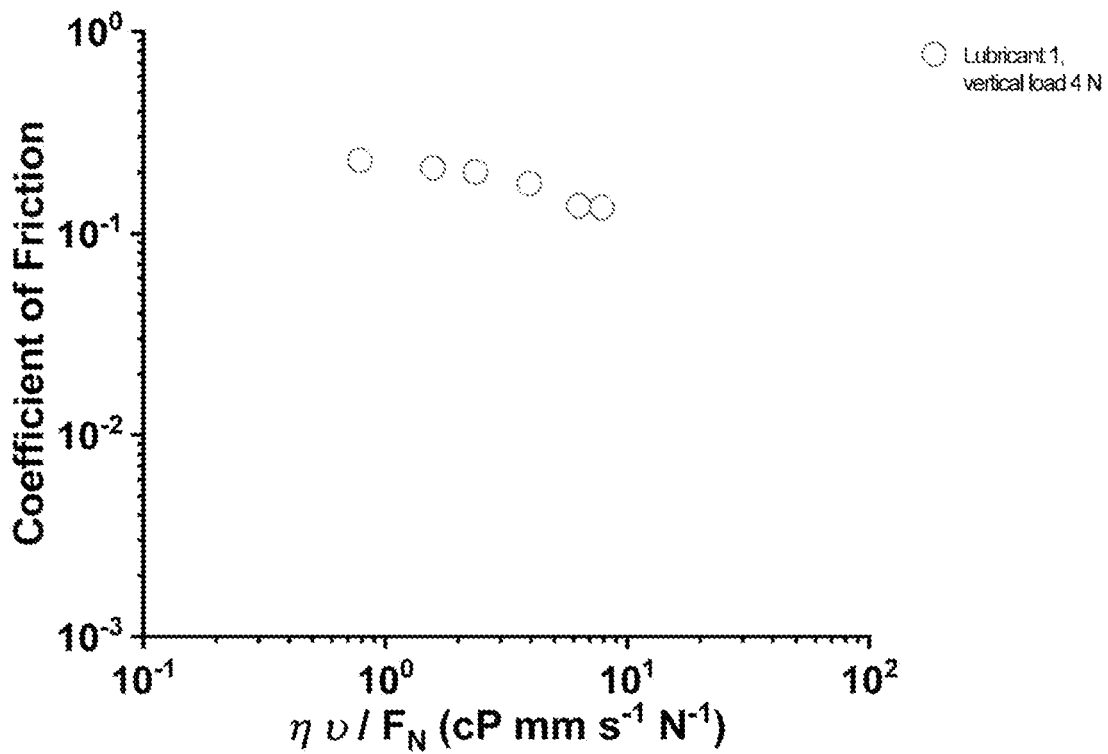

[Fig. 3]
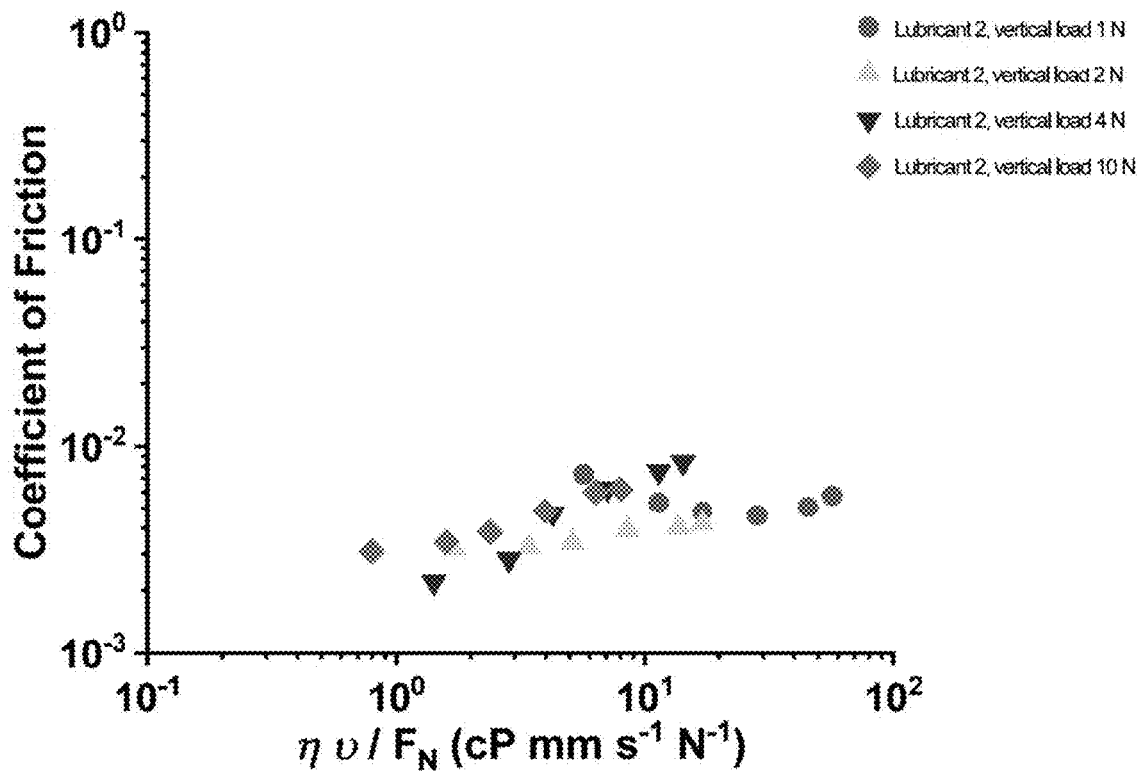
[Fig. 4]
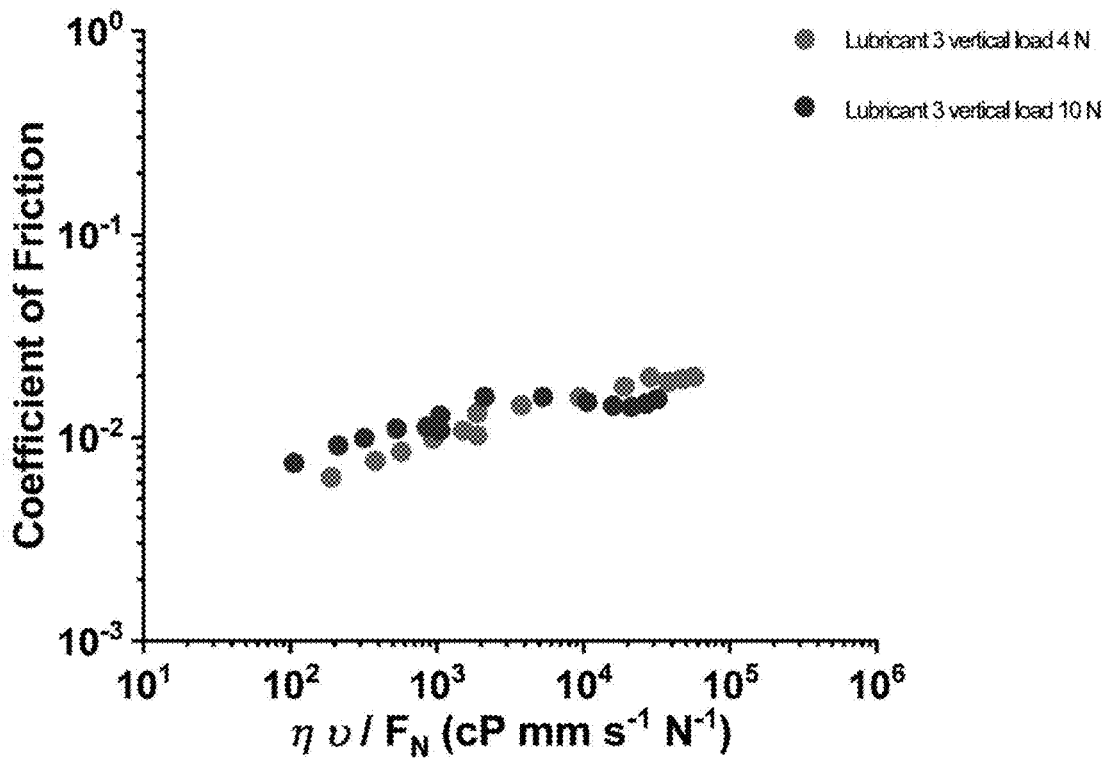

[Fig. 5]
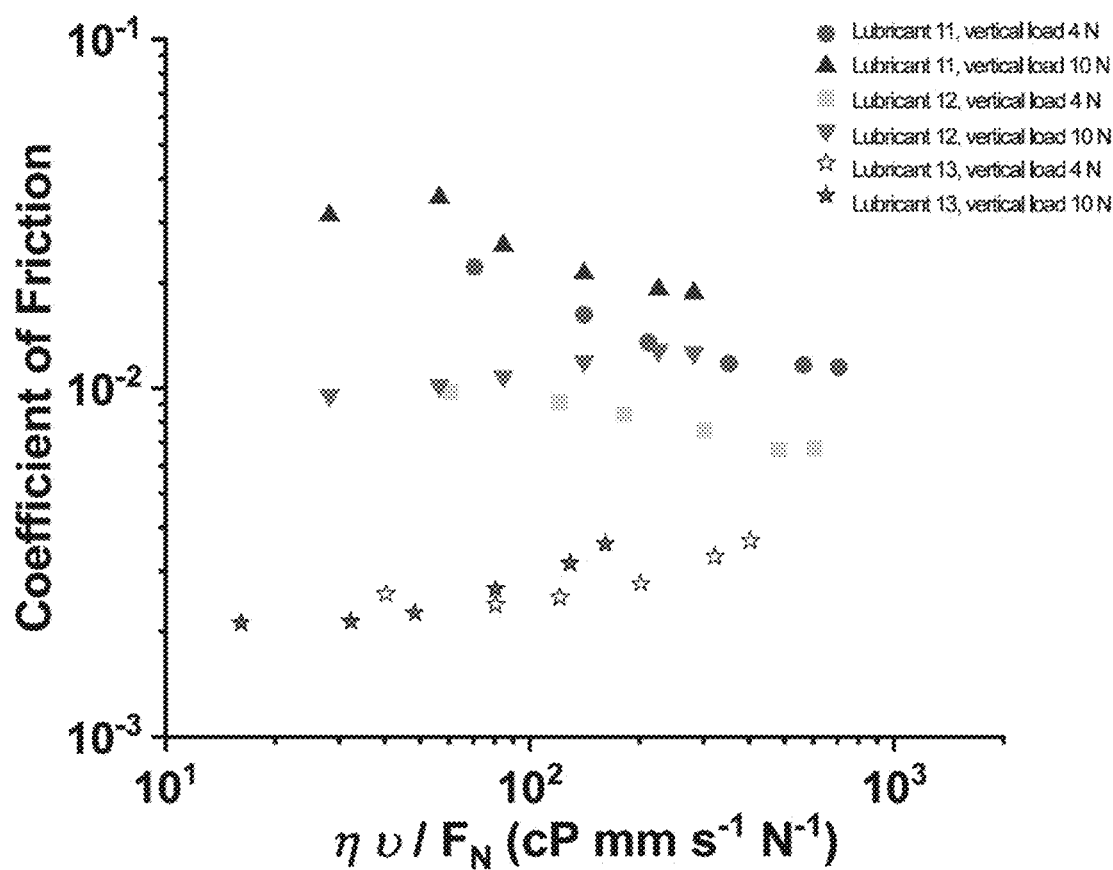

[Fig. 6]
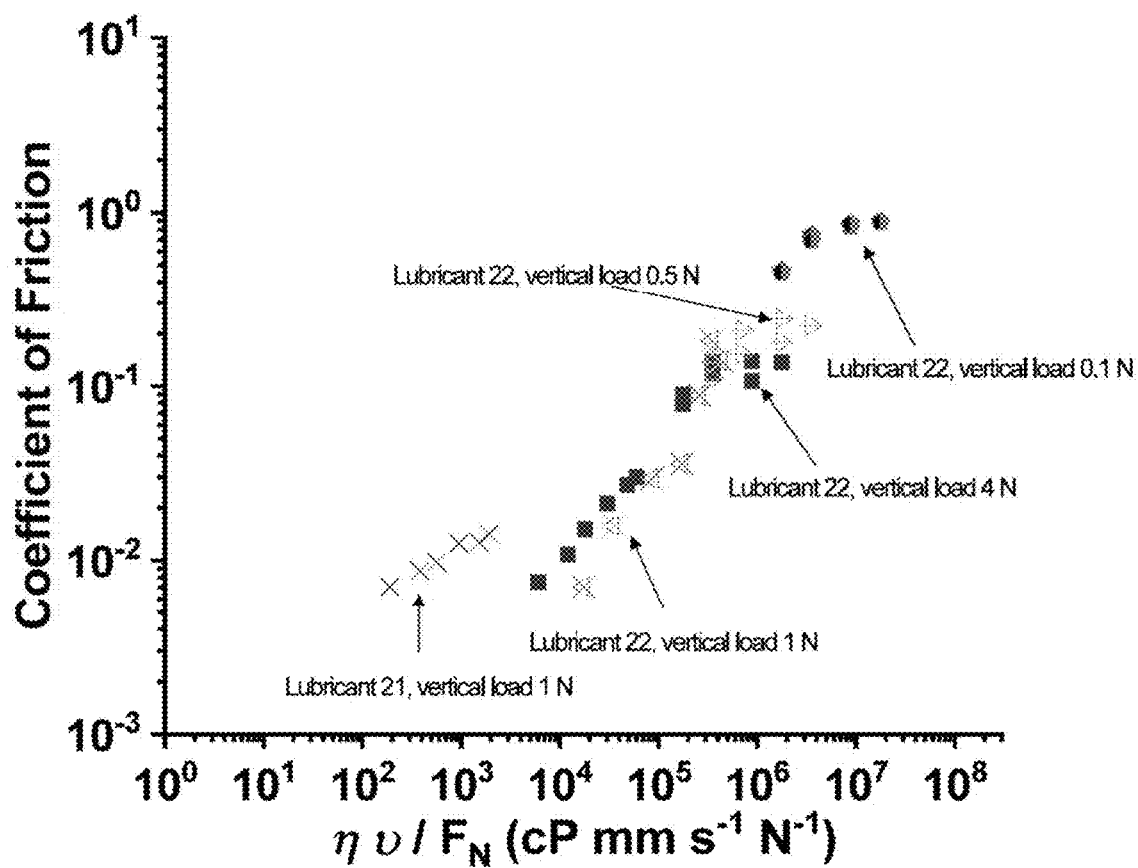

[Fig. 7]
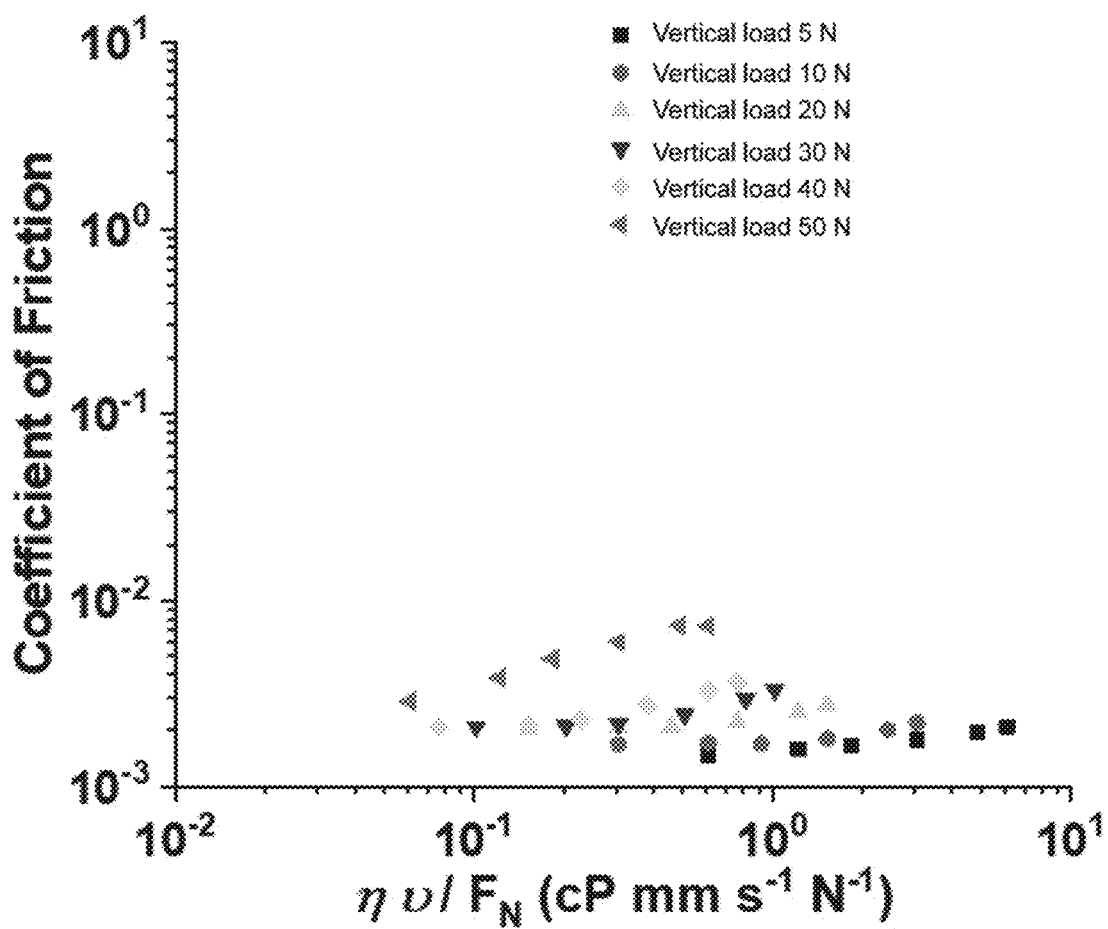

[Fig. 8]
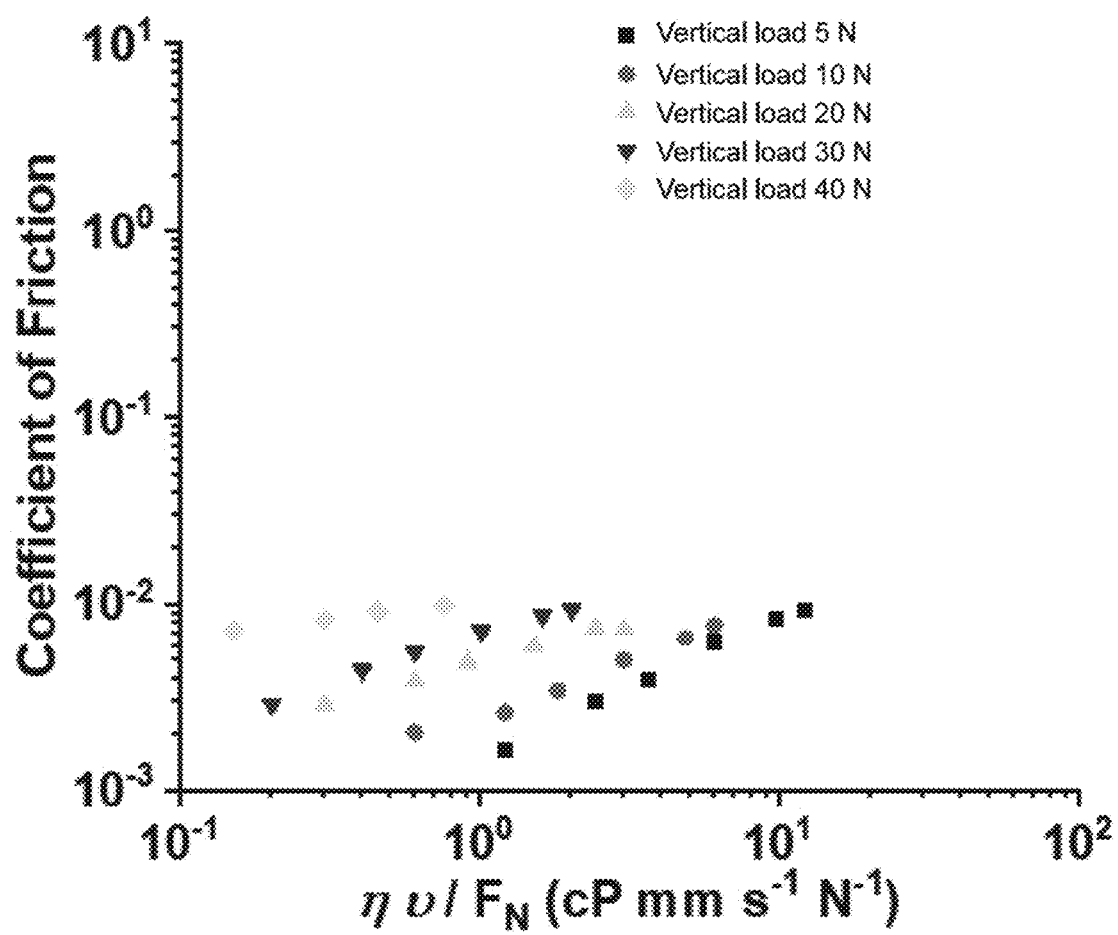

[Fig. 9]
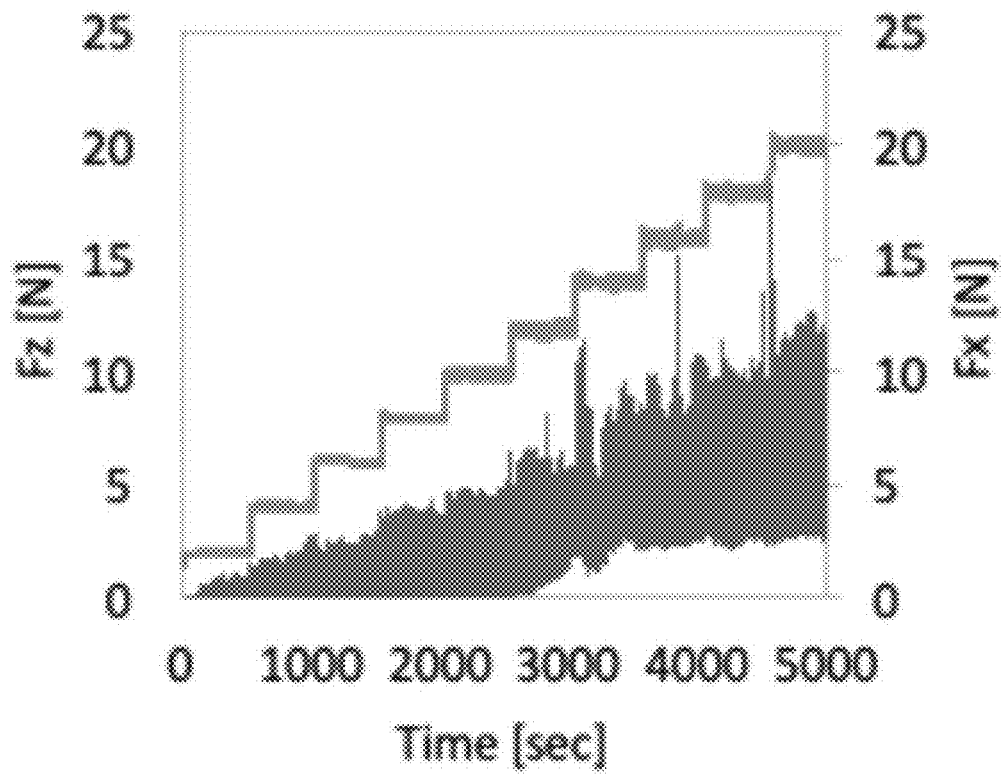
[Fig. 10]
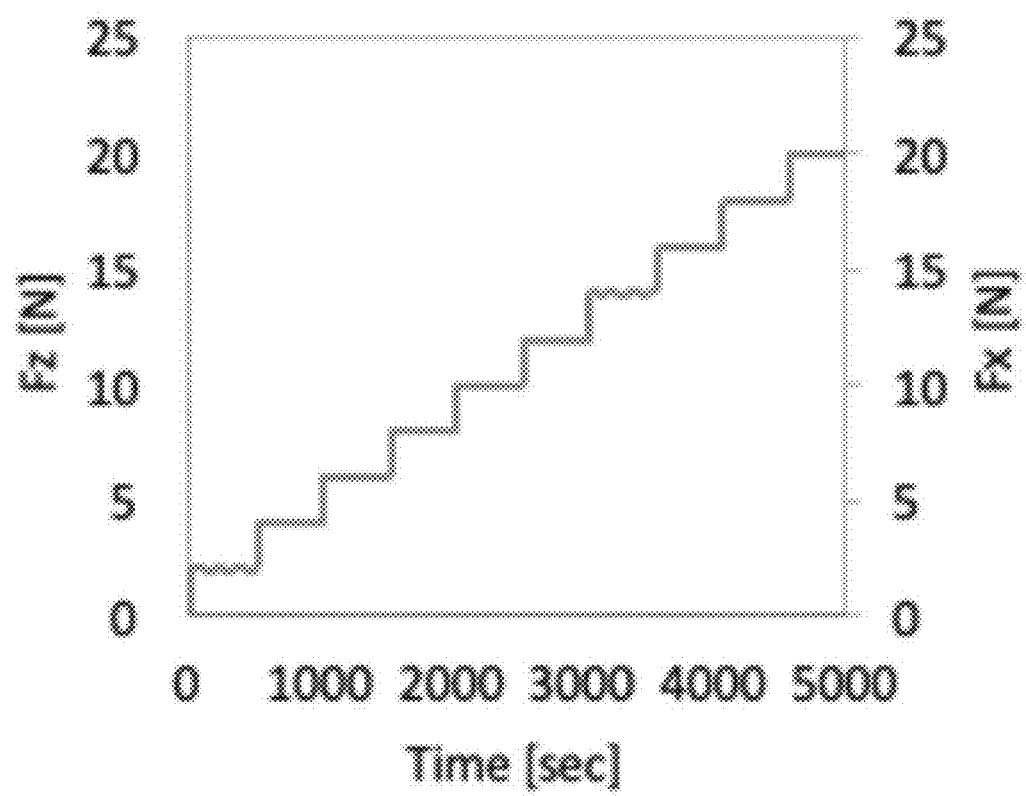

MATERIAL AND SLIDING SYSTEM

This application is a 371 of PCT/JP2020/044601, filed Dec. 1, 2020.

TECHNICAL FIELD

This invention relates to a material that contains a brush-like polymer chain assemblage formed of a plurality of polymer chains, and a sliding system.

BACKGROUND ART

Many mechanical products familiar with life have "movable part" in which components move in a combined manner as seen in compressor of air conditioner or loudspeaker, and often loss the energy due to friction occurred therein. Research and development have been made on reduction of such friction occurred in the movable part, mainly in the field of mechanical engineering. The reduction of friction in the field of mechanical engineering has, however, largely relied upon metal working technology such as polishing surface of the components, needing advanced skill therefor, and raising problems of large labor consumption, large time consumption, and large capital investment.

Recent researches have been directed to brush-like polymer chain assemblage composed of a plurality of polymer chains, such as polymer brush or bottle-brush polymer. Investigations have been made on forming the polymer chain assemblage on the sliding face of the components, for use as a sliding member (see Patent Literatures 1, 2).

CITATION LIST

Patent Literature

[Patent Literature 1] WO2017/171071
[Patent Literature 2] JP 2019-065284 A

SUMMARY OF THE INVENTION

Technical Problem

In recent years, the sliding member is required to further improve the lubricating performance. It is therefore an object of this invention to provide a novel material that excels in lubricating performance and so forth, and a sliding system.

Solution to Problem

In a case of using the sliding member, having on the sliding face thereof a brush layer that contains a brush-like polymer chain assemblage formed of a plurality of polymer chains such as polymer brush or bottlebrush polymer, for lubrication against the mating member, it has been a prior practice to use, as a lubricating liquid, a good solvent which is highly compatible with the polymer assemblage, and to swell the brush layer with the lubricating liquid.

The present inventors have found from our further investigations that an excellent lubrication performance is obtainable by swelling the polymer chain assemblage with a liquid different from the lubricating liquid (also referred to as swelling liquid, hereinafter), and, by causing phase separation between the swelling liquid and the lubricating liquid, thereby forming on the brush layer a liquid-liquid phase separation interface between the swelling liquid and the lubricating liquid. The finding led us to arrive at this invention. This invention provides the following items.

<1> A material comprising:
a support; and
a brush layer containing a brush-like polymer chain assemblage formed of a plurality of polymer chains and a swelling liquid, being swollen with the swelling liquid,
the brush layer retaining on the surface a lubricating liquid,
and
the swelling liquid contained in the brush layer and the lubricating liquid being phase-separated to form a liquid-liquid phase separation interface in between.

<2> The material of <1>, wherein the lubricating liquid is a liquid incompatible with the swelling liquid.

<3> The material of <1> or <2>, wherein affinity of the swelling liquid to the polymer chain assemblage is larger than affinity of the lubricating liquid to the polymer chain assemblage.

<4> The material of any one of <1> to <3>, wherein the lubricating liquid contains a liquid 1 which is different from the swelling liquid, and a liquid 2 which is a base liquid of the swelling liquid.

<5> The material of <4>, wherein the lubricating liquid contains the liquid 2 dissolved up to saturation in the liquid 1.

<6> The material of <4>, wherein the liquid 1 is incompatible with the swelling liquid, and
the lubricating liquid is an emulsion having the liquid 2 dispersed in the liquid 1.

<7> The material of any one of <1> to <6>, wherein the lubricating liquid contains a friction modifier.

<8> The material of any one of <1> to <7>, wherein the polymer chains that form the polymer chain assemblage are immobilized on the support, to form a polymer brush on the support.

<9> The material of any one of <1> to <7>, wherein the polymer chain assemblage has a bottle-brush structure in which the plurality of polymer chains that form the polymer chain assemblage are bound as side chains to a polymer chain.

<10> The material of any one of <1> to <9>, being a sliding member.

<11> A sliding system comprising a member with a sliding face, and an opposing member arranged opposed to the sliding face of the member, the sliding system
having, on the member with the sliding face, a brush layer containing a brush-like polymer chain assemblage formed of a plurality of polymer chains and a swelling liquid, being swollen with the swelling liquid, and
retaining, between the brush layer and the opposing member and on the brush layer, a lubricating liquid,
and,
the swelling liquid contained in the brush layer and the lubricating liquid being phase-separated to form a liquid-liquid phase separation interface in between.

<12> The sliding system of <11>, having, on the surface of the opposing member, a brush-like polymer chain assemblage layer formed of a plurality of polymer chains containing a swelling liquid, or a layer with a polymer network structure layer containing the swelling liquid.

Advantageous Effects of Invention

This invention can provide a material that excels in lubrication performance, and a sliding system.

BRIEF DESCRIPTION OF DRAWINGS

FIG. 1 A schematic drawing illustrating a material of this invention.

FIG. 2 A Stribeck curve in Test Example 2, obtained from a frictional test with use of a lubricating liquid 1, under a load of 4 N.

FIG. 3 A Stribeck curve in Test Example 2, obtained from a frictional test with use of a lubricating liquid 2, under loads of 1 N, 2 N, 4 N and 10 N.

FIG. 4 A Stribeck curve in Test Example 2, obtained from a frictional test with use of a lubricating liquid 3, under loads of 4 N and 10 N.

FIG. 5 A Stribeck curve in Test Example 3.

FIG. 6 A Stribeck curve in Test Example 4.

FIG. 7 A Stribeck curve in Test Example 5, with use of a test specimen 5 as an opposing member.

FIG. 8 A Stribeck curve in Test Example 5, with use of a test specimen 6 as an opposing member.

FIG. 9 A chart illustrating results of a frictional test in Test Example 6, with use of a lubricating liquid 31 as the lubricating liquid.

FIG. 10 A chart illustrating results of a frictional test in Test Example 6, with use of a lubricating liquid 32 as the lubricating liquid.

DESCRIPTION OF EMBODIMENTS

All numerical ranges given in this patent specification, using "to" preceded and succeeded by numerals, are used to represent the ranges including these numerals respectively as the lower and upper limit values.

In this patent specification, "(meth)acrylate" means "acrylate" and/or "methacrylate", and "(meth)acryl" means "acryl" and/or "methacryl".

<Material>

The material of this invention is designed to have a support; and a brush layer that contains a brush-like polymer chain assemblage formed of a plurality of polymer chains and a swelling liquid, and is swollen with the swelling liquid, wherein the brush layer retains on the surface a lubricating liquid, and the swelling liquid contained in the brush layer and the lubricating liquid are phase-separated to form a liquid-liquid phase separation interface in between.

The material of this invention has, on the support, the brush layer that contains the brush-like polymer chain assemblage formed of a plurality of polymer chains, and the swelling liquid. Since the brush layer is swollen with the swelling liquid, so that each polymer chain composing the brush-like polymer chain assemblage is kept stretched. The material thus has a large compressive modulus and excels in flexibility. With each polymer chain kept stretched, the brush-like polymer chain assemblage is prevented from causing interpenetration of the polymer chains during sliding, and this makes it possible to further reduce a friction coefficient during sliding against the opposing member. Since in the material of this invention, the brush layer retains on the surface the lubricating liquid, and the swelling liquid contained in the brush layer and the lubricating liquid are phase-separated to form a liquid-liquid phase separation interface in between, so that the liquid-liquid phase separation interface may be used as a shear plane during sliding. By virtue of high fluidity and low adhesiveness ascribed to the liquid, the friction coefficient during sliding against the opposing member may further be reduced. Hence, the material of this invention has excellent lubrication performance.

Note that the polymer chain assemblage used in this invention is an assemblage of a plurality of polymer chains and has the form of a brush as a whole, and is therefore completely different from an organic film formed simply by coating a polymer solution.

In the material of this invention, thickness of the brush layer (thickness measured in the state swollen with the swelling liquid, referred to as swollen film thickness hereinafter) is preferably 1 μm or larger, from the viewpoint that better lubrication performance will be more easily obtainable, which is more preferably 1.5 μm or larger, even more preferably 2 μm or larger, yet more preferably 2.5 μm or larger, and particularly preferably 3 μm or larger. The upper limit value, although not specifically limited, may typically be 100 μm or below, and may also be 50 μm or below.

In the material of this invention, thickness of the brush layer before swollen with the swelling liquid (referred to as dry thickness, hereinafter) is preferably 50 nm or larger, from the viewpoint that better lubrication performance will be more easily obtainable, which is more preferably 100 nm or larger, even more preferably 300 nm or larger, yet more preferably 500 nm or larger, and particularly preferably 1000 nm or larger. The upper limit value, although not specifically limited, may typically be 100 μm or below, and may also be 50 μm or below.

In the material of this invention, swelling ratio [(swollen film thickness of brush layer/dry thickness of brush layer)× 100] of the brush layer is preferably 100% or larger, from the viewpoint that better lubrication performance will be more easily obtainable, which is more preferably 150% or larger, and even more preferably 200% or larger.

The dry thickness and the swollen film thickness of the brush layer may be measured typically by spectral ellipsometry.

Compressive modulus of the brush layer is preferably 0.1 MPa or larger from the viewpoint that plastic deformation or fracture will become less likely to occur under pressure during sliding, which is more preferably 1 MPa or larger, and even more preferably 10 MPa or larger. The compressive modulus of the brush layer may be measured typically by colloidal REM probe method.

The material of this invention, having excellent lubrication performance, may be preferably used as a sliding member. The material of this invention may also be used for sealing material, slide bearing and so forth.

FIG. 1 is a schematic drawing illustrating an embodiment of the material of this invention. A material 1 illustrated in FIG. 1 has a brush layer 20 formed on a support 10. The brush layer 20 contains a brush-like polymer chain assemblage 21 formed of a plurality of polymer chains, and a swelling liquid 22, and is swollen with the swelling liquid 22. The brush layer 20 has on the surface thereof a lubricating liquid 30. The swelling liquid contained in the brush layer and the lubricating liquid are phase-separated to form a liquid-liquid phase separation interface 40 on the brush layer 20. The lubricating liquid 30 may alternatively be held typically by a polymer chain assemblage or a polymer mesh.

Although the material illustrated in FIG. 1 has the polymer chains that compose the polymer chain assemblage 21 immobilized on the support 10, thus forming the polymer brush composed of the polymer chain assemblage on the support 10, the polymer chain assemblage 21 that composes the brush layer 20 may alternatively form a polymer with a bottle-brush structure in which the plurality of polymer chains that form the polymer chain assemblage are bound as side chains to a polymer chain which is a principal chain as a base. Again although each polymer chain that composes the polymer chain assemblage 21, illustrated in FIG. 1, is immobilized only at one end of the polymer chain on the support 10, each polymer chain may alternatively be immobilized at both ends on the support 10, to form a loop structure.

The material of this invention will be detailed below.

<<Support>>

The material of this invention has the brush layer on the support. Type of the support is suitably selectable depending on applications. For example, types of the material of this invention intended for use as a sliding member are exemplified by bearing, cam, valve lifter, follower, shim, valve, valve guide, cylinder liner, piston, piston ring, piston pin, crank shaft, gear, rotor, rotor housing, valve, valve guide, pump and mechanical seal.

Material of the support is suitably selectable from organic material, inorganic material and so forth. The organic material is not specifically limited, for which various resins and rubbers are employable without limitation. The resin may either be thermosetting resin or thermoplastic resin. The thermosetting resin is exemplified by epoxy resin, phenol resin, amino resin, unsaturated polyester resin, polyurethane resin, urea resin, melamine resin, thermosetting polyimide resin, and diallyl phthalate resin. The thermoplastic resin is exemplified by polyolefin resins such as polyethylene, polypropylene, polystyrene, and polycycloolefin; vinyl resins such as polystyrene, acryl resin, polyvinyl chloride resin, and polyvinyl alcohol; fluororesins such as polytetrafluoroethylene; polyester resins such as polyethylene terephthalate, polybutylene terephthalate, polytrimethylene terephthalate, and polyethylene naphthalate; and silicone resins such as polydimethylsiloxane. The rubber is exemplified by diene rubbers such as butadiene rubber, styrene-butadiene rubber, chloroprene rubber, isoprene rubber, natural rubber, nitrile rubber, and butyl rubber; and rubbers other than the diene rubbers such as ethylene-propylene rubber, acrylic rubber, polyether rubber, polyurethane rubber, fluororubber, and silicone rubber. The inorganic material is exemplified by, but not specifically limited to, ceramics (for example, alumina ceramic, bioceramic, and composite ceramic such as zirconia-alumina composite ceramic); metals (for example, iron; cast iron; ferroalloys such as steel, stainless steel, carbon steel, and high carbon chromium bearing steel material (SUJ2); non-ferrous metals and non-ferrous alloys such as aluminum, zinc, copper and titanium); silicon such as polysilicon, silicon oxide, silicon nitride, various glasses, quarts, and composite materials of any of these materials.

Brush Layer>>

The brush layer that composes the material of this invention contains the brush-like polymer chain assemblage formed of a plurality of polymer chains, and a swelling liquid, and is swollen by the swelling liquid.

[Polymer Chain Assemblage]

The polymer chain assemblage that composes the brush layer is formed of a plurality of polymer chains, and gives a brush-like shape as a whole. The "polymer chain" means a molecule having a structure in which a plurality of structural units are chained, or a moiety of such molecule. The plurality of polymer chains that compose the polymer chain assemblage may be same or different. The polymer chain may only have a structure in which the plurality of structural units are chained, and may have a side chain, a branched structure, or a crosslinked structure.

(Polymer Chain)

The polymer chains that compose the polymer chain assemblage may be non-electrolyte polymer or electrolyte polymer, and may be hydrophobic polymer or hydrophilic polymer.

The non-electrolyte polymer is typically exemplified by poly(methyl methacrylate) (PMMA). The electrolyte polymer is exemplified by poly(sodium sulfonated glycidyl methacrylate) (PSGMA), and ionic liquid polymer. The hydrophobic polymer is exemplified by poly(alkyl (meth) acrylate) such as poly(methyl methacrylate). The hydrophilic polymer is exemplified by poly(hydroxyalkyl (meth) acrylate) such as poly(2-hydroxyethyl methacrylate) (PHEMA), and poly(meth)acrylate having polyethylene glycol side chain. The hydrophilic polymer may be synthesized by using a hydrophilic monomer; or may be synthesized first by using a hydrophobic monomer to produce a polymer, and then by introducing a hydrophilic group to the polymer.

The polymer chain may be a homopolymer having a single kind of monomer polymerized therein, or may be a copolymer having two or more kinds of monomer polymerized therein. The copolymer is exemplified by random copolymer, block copolymer, and gradient copolymer.

The monomer used for producing the polymer chain is preferably any of those that can be polymerized to yield a polymer chain graftable to a support or a base such as a support or a polymer chain. Such monomer is exemplified by monomer having at least one addition-polymerizable double bond, and is preferably a monofunctional monomer having one addition-polymerizable double bond. The monofunctional monomer having one addition-polymerizable double bond is exemplified by (meth)acrylate-based monomer, and styrene-based monomer.

The (meth)acrylate-based monomer is exemplified by (meth)acrylic acid, methyl (meth)acrylate, ethyl (meth)acrylate, propyl (meth)acrylate, isopropyl (meth)acrylate, butyl (meth)acrylate, isobutyl (meth)acrylate, tert-butyl (meth) acrylate, pentyl(meth)acrylate, hexyl(meth)acrylate, cyclohexyl (meth)acrylate, heptyl(meth)acrylate, octyl (meth) acrylate, 2-ethylhexyl (meth)acrylate, nonyl(meth)acrylate, decyl(meth)acrylate, dodecyl (meth)acrylate, phenyl (meth) acrylate, tolyl(meth)acrylate, benzyl (meth)acrylate, 2-methoxyethyl (meth)acrylate, 3-methoxypropyl (meth) acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 3-ethyl-3-(meth) acryloyloxymethyloxetane, 2-(meth)acryloyloxyethyl isocyanate, (meth)acrylate-2-aminoethyl, 2-(2-bromopropionyloxy)ethyl (meth)acrylate, 2-(2-bromoisobutylyloxy)ethyl (meth)acrylate, 1-(meth)acryloxy-2-phenyl-2-(2,2,6,6-tetramethyl-1-piperidinyloxy) ethane, 1-(4-((4-(meth)acryloxy) ethoxyethyl)phenylethoxy) piperidine, γ-(methacryloyloxypropyl) trimethoxysilane, 3-(3,5,7,9,11,13,15-heptaethylpentacyclo[9.5.1.13,9.15,15.17,13]octasiloxane-1-yl) propyl(meth)acrylate, 3-(3,5,7,9,11,13,15-heptaisobutylpentacyclo[9.5.1.13,9.15,15.17,13] octasiloxane-1-yl)propyl(meth)acrylate, 3-(3,5,7,9,11,13, 15-heptaisooctylpentacyclo[9.5.1.13,9.15,15.17,13] octasiloxane-1-yl)propyl(meth)acrylate, 3-(3,5,7,9,11,13, 15-heptacyclopentylpentacyclo[9.5.1.13,9.15,15.17,13] octasiloxane-1-yl) propyl(meth)acrylate, 3-(3,5,7,9,11,13, 15-heptaphenylpentacyclo[9.5.1.13,9.15,15.17,13] octasiloxane-1-yl)propyl(meth)acrylate, 3-[(3,5,7,9,11,13, 15 heptaethylpentacyclo[9.5.1.13,9.15,15.17,13] octasiloxane-1-yloxy)dimethylsilyl]propyl(meth)acrylate, 3-[(3,5,7,9,11,13,15-heptaisobutylpentacyclo[9.5.1.13,9.15, 15.17,13]octasiloxane-1-yloxy)dimethylsilyl]propyl(meth) acrylate, 3-[(3,5,7,9,11,13,15-heptaisooctylpentacyclo

[9.5.1.13,9.15,15.17,13]octasiloxane-1-yloxy)dimethylsilyl]propyl(meth)acrylate, 3-[(3,5,7,9,11,13,15-heptacyclopentylpentacyclo[9.5.1.13,9.15,15.17,13]octasiloxane-1-yloxy)dimethylsilyl]propyl(meth)acrylate, 3-[(3,5,7,9,11,13,15-heptaphenylpentacyclo[9.5.1.13,9.15,15.17,13] octasiloxane-1-yloxy)dimethylsilyl]propyl (meth)acrylate, ethylene oxide adduct of (meth)acrylic acid, trifluoromethylmethyl(meth)acrylate, 2-trifluoramethylethyl(meth)acrylate, 2-perfluoroethylethyl(meth)acrylate, 2-perfluoroethyl-2-perfluorobutylethyl(meth)acrylate, 2-perfluoroethyl(meth)acrylate, trifluoromethyl(meth)acrylate, diperfluoromethylmethyl (meth)acrylate, 2-perfluoromethyl-2-perfluoroethylethyl(meth)acrylate, 2-perfluorohexylethyl(meth)acrylate, 2-perfluorodecylethyl(meth)acrylate, and 2-perfluorohexadecylethyl(meth)acrylate.

The styrene-based monomer is exemplified by styrene, vinyltoluene, α-methylstyrene, p-chlorostyrene, p-chloromethylstyrene, ln-chloromethylstyrene, o-aminostyrene, p-styrenechlorosulfonic acid, styrenesulfonic acid and salt thereof, vinylphenylmethyl dithiocarbamate, 2-(2-bronopropionyloxy) styrene, 2-(2-bromoisobutylyloxy)styrene, 1-(2-((4-vinylphenyl)methoxy)-1-phenylethoxy)-2,2,6,6-tetramethylpiperidine, 1-(4-vinylphenyl)-3,5,7,9,11,13,15-heptaethylpentacyclo[9.5.1.13,9.15,15.17,13]octasiloxane, 1-(4-vinylphenyl)-3,5,7,9,11,13,15-heptaisobutyl pentacyclo[9.5.1.13,9.15,15.17,13]octasiloxane, 1-(4-vinylphenyl)-3,5,7,9,11,13,15-heptaisooctylpentacyclo[9.5.1.13,9.15, 15.17,13]octasiloxane, 1-(4-vinylphenyl)-3,5,7,9,11,13,15-heptacyclopentylpentacyclo[9.5.1.13,9.15,15.17,13] octasiloxane, 1-(4-vinylphenyl)-3,5,7,9,11,13,15-heptaphenylpentacyclo[9.5.1.13,9.15,15.17,13] octasiloxane, 3 (3,5,7,9,11,13,15-heptaethylpentacyclo [9.5.1.13,9.15,15.17,13]octasiloxane-1-yl)ethylstyrene, 3-(3,5,7,9,11,13,15-heptaisobutyl pentacyclo[9.5.1.13,9.15, 15.17,13]octasiloxane-1-yl)ethylstyrene, 3-(3,5,7,9,11,13, 15-heptaisooctylpentacyclo[9.5.1.13,9.15,15.17,13]octasiloxane-1-yl)ethylstyrene, 3-(3,5,7,9,11,13,15-heptacyclopentylpentacyclo[9.5.1.13,9.15,15.17,13] octasiloxane-1-yl)ethylstyrene, 3-(3,5,7,9,11,13,15-heptaphenylpentacyclo[9.5.1.13,9.15,15.17,13] octasiloxane-1-yl)ethylstyrene, 3-((3,5,7,9,11,13,15-heptaethylpentacyclo[9.5.1.13,9.15,15.17,13]octasiloxane-1-yloxy)dimethylsilyl)ethylstyrene, 3-((3,5,7,9,11,13,15-heptaisobutyl pentacyclo[9.5.1.13,9.15,15.17,13] octasiloxane-1-yloxy)dimethylsilyl)ethylstyrene, 3-H3,5,7, 9,11,13,15-heptaisooctylpentacyclo[9.5.1.13,9.15,15.17,13] octasiloxane-1-yloxy)dimethylsilyl)ethylstyrene, 3-((3,5,7, 9,11,13,15-heptacyclopentylpentacyclo[9.5.1.13,9.15, 15.17,13]octasiloxane-1-yloxy)dimethylsilyl)ethylstyrene, and 3-((3,5,7,9,11,13,15-heptaphenylpentacyclo[9.5.1.13, 9.15,15.17,13]octasiloxane-1-yloxy)dimethylsilyl)ethyl styrene.

The monofunctional monomer having one addition-polymerizable double bond in the molecule is exemplified by fluorovinyl monomers (perfluoroethylene, perfluoropropylene, vinylidene fluoride, etc.), silicon-containing vinyl monomers (vinyltrimethoxysilane, vinyltriethoxysilane, etc.), maleic anhydride, maleic acid, monoalkyl ester and dialkyl ester of maleic acid, fumaric acid, monoalkyl ester and dialkyl ester of fumaric acid, maleimide-based monomer (maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide, etc.), nitril group-containing monomer (acrylonitrile, methacrylonitrile, etc.), amido group-containing monomer (acrylamide, methacrylamide, etc.), vinyl ester-based monomer (vinyl acetate, vinyl propionate, vinyl pivalate, vinyl benzoate, vinyl cinnamate, etc.), olefins (ethylene, propylene, etc.), conjugated diene-based monomer (butadiene, isoprene, etc.), vinyl halide (vinyl chloride, etc.), vinylidene halide (vinylidene chloride, etc.), allyl halide (allyl chloride, etc.), allyl alcohol, vinylpyrrolidone, vinylpyridine, N-vinylcarbazole, methyl vinyl ketone, vinyl isocyanate, and macromonomer whose principal chain is derived from styrene, (meth)acrylate ester, siloxane, or the like.

The polymer chain is preferably produced by using at least one selected from hydrophobic monomer and hydrophilic monomer.

The hydrophobic monomer is exemplified by acrylate ester (for example, alkyl esters such as methyl acrylate, ethyl acrylate, propyl acrylate, butyl acrylate, cyclohexyl acrylate, or hexafluoroisopropyl acrylate, etc.; aryl acrylate such as phenyl acrylate, etc.; arylalkyl acrylate such as benzyl acrylate, etc.; alkoxyalkyl acrylate such as methoxymethyl acrylate, etc.); methacrylate ester (for example, alkyl methacrylate such as methyl methacrylate, ethyl methacrylate, propyl methacrylate, butyl methacrylate, cyclohexyl methacrylate, hexafluoroisopropyl methacrylate, etc.; aryl methacrylate such as phenyl methacrylate, etc.; arylalkyl methacrylate such as benzyl methacrylate, etc.; and alkoxyalkyl methacrylate such as ethoxymethyl methacrylate, etc.); fumaric ester (for example, alkyl fumarate such as dimethyl fumarate, diethyl fumarate, diallyl fumarate, etc.); maleate ester (for example, alkyl maleate such as dimethyl maleate, diethyl maleate, diallyl maleate, etc.); itaconate ester (for example, alkyl itaconate, etc.); crotonate ester (for example alkyl crotonate, etc.); methylvinyl ether; ethoxy ethyl vinyl ether; vinyl acetate; vinyl propionate; vinyl benzoate; and styrene. The hydrophobic monomer is exemplified by alkylstyrene, vinyl chloride, vinyl methyl ketone, vinyl stearate, vinyl alkyl ether, and mixture of any of them.

The hydrophilic monomer is exemplified by hydroxy-substituted alkyl acrylate (for example, 2-hydroxyethyl acrylate, 2-hydroxypropyl acrylate, 2-hydroxypropyl acrylate, 2,3-dihydroxypropyl acrylate, polyethoxyethyl acrylate, polyethoxypropyl acrylate, etc.), hydroxy-substituted alkyl methacrylate (for example, 2-hydroxyethyl methacrylate, 2-hydroxypropyl methacrylate, 2-hydroxypropyl methacrylate, 2,3-dihydroxypropyl methacrylate, polyethoxyethyl methacrylate, polyethoxypropyl methacrylate, etc.), acrylamide, N-alkylacrylamide (for example, N-methylacrylamide, N,N-dimethylacrylamide, etc.), N-alkylmethacrylamide (for example, N-methylmethacrylamide, etc.), polyethylene glycol monoacrylate, polyethylene glycol monomethacrylate, alkoxy polyethylene glycol acrylate, alkoxy polyethylene glycol methacrylate, phenoxy polyethylene glycol acrylate, phenoxy polyethylene glycol methacrylate, and 2-glucosyloxyethyl methacrylate. The hydrophilic monomer is also preferably acrylic acid, methacrylic acid, fumaric acid, maleic acid, itaconic acid, crotonic acid, methacrylamide, N-vinylpyrrolidone, N,N-dimethylaminoethyl(meth)acrylate, or quaternary ammonium salt thereof.

Also a monomer having a specific group in the side chain is suitably used for production of the polymer chain. For example, a monomer having in the side chain thereof a group which is easily converted to a carboxy group or a carboxylic salt is preferred, since the produced polymer chain will have a group in the side chain thereof converted to a carboxy group or a carboxylic salt, and will become hydrophilic. The monomer having, in the side chain thereof, a group which is easily converted to a carboxy group or a carboxylic salt is exemplified by tert-butyl(meth)acrylate.

Also an ionic liquid monomer is suitably used for producing the polymer chain. The ionic liquid monomer is exemplified by, but not specifically limited to, compounds represented by formula (1) below.

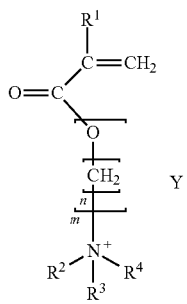
(1)

In formula (1), m represents an integer of 1 to 10, and n represents an integer of 1 to 5. $R^1$ represents a hydrogen atom, or an alkyl group having 1 to 3 carbon atoms, and each of $R^2$, $R^3$ and $R^4$ independently represents an alkyl group having 1 to 5 carbon atoms. The alkyl group represented by each of $R^2$, $R^3$ and $R^4$ may have one or more hetero atoms selected from oxygen atom, sulfur atom and fluorine atom that substitutes the carbon atom or the hydrogen atom, and two or more among $R^2$, $R^3$ and $R^4$ may combine to form a cyclic structure.

Y represents a monovalent anion. The monovalent anion represented by Y is exemplified by, but not specifically limited to, $BF_4^-$, $PF_6^-$, $AsF_6^-$, $SbF_6^-$, $AlCl_4^-$, $NbF_6^-$, $HSO_4^-$, $ClO_4^-$, $CH_3SO_3^-$, $CF_3SO_3^-$, $CF_3CO_2^-$, $(CF_3SO_2)_2N^-$, $Cl^-$, $Br^-$, and $I^-$. Considering stability of the anion, preferred is $BF_4^-$, $PF_6^-$, $(CF_3SO_2)_2N^-$, $CF_3SO_3^-$, or $CF_3CO_2^-$.

Among from the compounds represented by formula (1), the ionic liquid monomer is particularly preferably any of those represented by formulae (2) to (9) below.

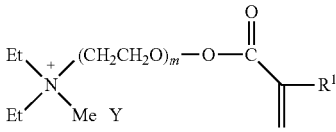
(2)

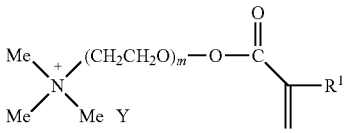
(3)

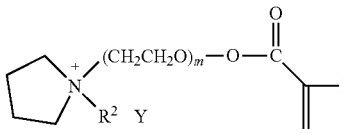
(4)

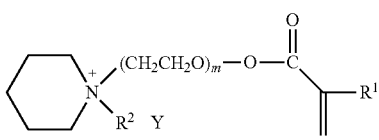
(5)

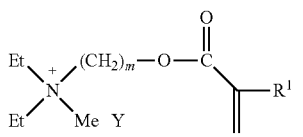
(6)

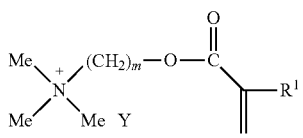
(7)

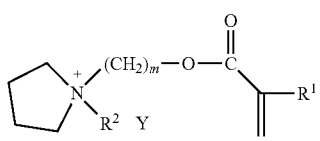
(8)

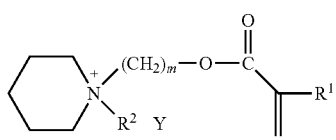
(9)

In formulae (2) to (9), m, $R^1$, $R^2$ and Y are respectively synonymous to m, $R^1$, $R^2$ and Y in formula (1). Me represents a methyl group, and Et represents an ethyl group.

Only one monomer may be used singly, or two or more monomers may be used in combination, to produce these polymer chains.

The polymer chain assemblage may have a crosslinked structure formed between the polymer chains, or between the polymer chain and the base. This successfully controls elastic modulus of the polymer chain assemblage. The crosslinked structure formed between the polymer chains may be either a physically crosslinked structure or a chemically crosslinked structure. The crosslinked structure may be formed concurrently with a polymerization reaction for producing the polymer chain, or subsequent to the production of the polymer chain. Formation of the crosslinked structure concurrently with the polymerization reaction for producing the polymer chain may be carried out by adding, to a polymerization reaction liquid, a proper amount of a bifunctional monomer like a divinyl monomer such as ethylene glycol dimethacrylate, in addition to a monofunctional monomer for producing the polymer chain. Meanwhile, formation of the crosslinked structure between the produced polymer chains or between the polymer chain and the base may be carried out by preliminarily introducing a crosslinking group to the polymer chain with use of a monomer having a crosslinking group, and then by allowing the crosslinking group to react with a reactive group of other polymer chain, or to react with a reactive group on the base. The crosslinking group is exemplified by azido group, halogen group (preferably bromo group), alkoxysilyl group, isocyanate group, vinyl group, and thiol group. Also a reactive group that remains at the terminal of the graft chain, after living radical polymerization of the polymer chain, may be used as the crosslinking group.

The polymer chain that composes the polymer chain assemblage of the brush layer may be immobilized on the support, thus making the polymer brush composed of the polymer chain assemblage formed on the support. Alternatively, the polymer chain assemblage may form a polymer having a bottle-brush structure in which the plurality of polymer chains that form the polymer chain assemblage are bound as side chains to a polymer chain as the base. In a case where the polymer chains that form the polymer chain assemblage are immobilized on the support to form the polymer brush, each polymer chain may be immobilized at only one terminal thereof on the support, or may be immobilized at both terminals thereof on the support. In a case where both terminals of the polymer chain are immobilized on the support, the polymer chain has a loop structure, and such polymer chain assemblage forms a polymer brush having a loop structure.

The following paragraphs will describe methods for forming the polymer chain assemblage, both for the polymer brush and the polymer having the bottle-brush structure.

[A] Polymer Brush

The polymer chain assemblage of the polymer brush is obtainable by graft polymerization by which a plurality of polymer chains, as the graft chains, are bound typically to a carrier such as a support as a base. The graft polymerization can proceed according to the grafting-from method or the grafting-to method, among them preferred is the grafting-from method. Now, the grafting-from method relies upon introduction of a polymerization initiating group to the base, followed by growth of a graft chain from the polymerization initiating group, meanwhile the grafting-to methods relies upon binding of a preliminarily synthesized graft chain to a reaction point having been introduced to the base.

The polymer chain assemblage is obtainable alternatively by a method in which a hydrophobic moiety of a polymer having a hydrophobic block and a hydrophilic block (di-block copolymer), is hydrophobically bound to the surface of a hydrophobic base or a hydrophobicized base. The diblock copolymer is exemplified by a copolymer having a polymethyl methacrylate (PMMA) structure as the hydrophobic block and a poly(sodium sulfonated glycidyl methacrylate) (PSGMA) structure as the hydrophilic block. Some other polymer structure may be interposed between the PMMA structure and the PSGMA structure. Details of this method may be understood with reference to *Nature*, 425, 163-165 (2003), and so forth.

There is no special limitation on material for composing the base on which the polymer chain of the polymer chain assemblage in the form of polymer brush is immobilized. The material is suitably selectable from organic material, inorganic material and so forth. Also the aforementioned support per se may be used as the base.

(Graft Polymerization)

The following paragraphs will specifically describe a method for forming the polymer chain assemblage by graft polymerization.

Production of Polymer Chain

Method for producing the polymer chain used in the graft polymerization is preferably, but not specifically limited to, radical polymerization, more preferably living radical polymerization (LRP), and even more preferably atom transfer radical polymerization (ATRP). The living radical polymerization is advantageous in that the molecular weight and molecular weight distribution of the polymer chain will be easily controllable, and that various types of copolymer (for example, random copolymer, block copolymer, gradient copolymer, etc.) may be produced as the graft chain. The living radical polymerization can also produce a later-described dense polymer brush while precisely controlling the density and thickness thereof, by employing a high pressure condition or an ionic liquid solvent. Method of graft polymerization, when employing the living radical polymerization, may be either the grafting-from method or the grafting-to method, among them preferred is the grafting-from method. Detail of the graft polymerization based on combination of the living radical polymerization and the grafting-from method may be understood with reference to JP H11-263819 A and so forth. Detail of the atom transfer radical polymerization may be understood with reference to *J. Am. Chem. Soc.*, 117, 5614 (1995), *Macromolecules*, 28, 7901 (1995), *Science*, 272, 866 (1996), and *Macromolecules*, 31, 5934-5936 (1998).

The polymer chain may also be produced by nitroxide-mediated polymerization (NMP), reversible addition-fragmentation chain transfer polymerization (RAFT), reversible chain transfer catalyzed polymerization (RTCP), reversible complexation mediated polymerization (RCMP), and so forth.

Catalyst used for the radical polymerization may only be a substance capable of controlling the radical polymerization, and is preferably a transition metal complex. Preferred examples of the transition metal complex include metal complexes having, as the center metal, Group 7, Group 8, Group 9, Group 10, or Group 11 element in the periodic table, among them, preferably usable are copper complex, ruthenium complex, iron complex, or nickel complex, and more preferably usable is copper complex. The copper complex is preferably a complex formed between a monovalent copper compound and organic ligands. The monovalent copper compound is exemplified by copper(I) chloride and copper(I) bromide. The organic ligand is exemplified by 2,2'-bipyridyl or derivative thereof, 1,10-phenanthroline or derivative thereof, polyamine (tetramethylethylenediamine, pentamethyldiethylene triamine, hexamethyl tris(2-aminoethyl)amine, etc.), and polycyclic alkaloid such as L-(-)-sparteine. Also a tris(triphenylphosphine) complex of divalent ruthenium chloride ($RuCl_2(PPh_3)_3$) is suitable as the catalyst. In a case where the ruthenium compound is used as the catalyst, aluminum alkoxide-based compound is preferably added as an activator. Also bis(triphenylphosphine) complex of iron (II) (($FeCl_2(PPh_3)_2$), bis(triphenylphosphine) complex of nickel (II)($NiCl_2(PPh_3)_2$)bis(tributylphosphine) complex of nickel (II) ($NiBr_2(PBu_3)_2$) are preferred as the catalyst.

The polymerization reaction is preferably allowed to proceed in a solvent. The solvent is exemplified by hydrocarbon-based solvent (benzene, toluene, etc.), ether-based solvent (diethyl ether, tetrahydrofuran, diphenyl ether, anisole, dimethoxybenzene, etc.), halogenated hydrocarbon-based solvent(methylene chloride, chloroform, chlorobenzene, etc.), ketone-based solvent (acetone, methyl ethyl ketone, methyl isobutyl ketone, etc.), alcohol-based solvent (methanol, ethanol, propanol, isopropanol, butyl alcohol, t-butyl alcohol, etc.), nitrile-based solvent (acetonitrile, propionitrile, benzonitrile, etc.), ester-based solvent (ethyl acetate, butyl acetate, etc.), carbonate-based solvent (ethylene carbonate, propylene carbonate, etc.), amide-based solvent (N,N-dimethylformamide, N,N-dimethylacetamide), hydrochlorofluorocarbon-based solvent (1,1-dichloro-1-fluoroethane, dichloropentafluoropropane), hydrofluorocarbon-based solvent (hydrofluorocarbon having 2 to 5 carbon atoms, hydrofluorocarbon having 6 or more carbon atoms), perfluorocarbon-based solvent (perfluoropentane, perfluorohexane), alicyclic hydrofluorocarbon-based solvent (fluorocyclopentane, fluorocyclobutane), oxygen-containing fluorinated solvent (fluoroether, fluoropolyether, fluoroketone, fluoroalcohol), and water. Only one of these solvents may be used singly, or two or more solvents may be used in combination.

Introduction of Polymerization Initiator

When forming the polymer chain assemblage typically by the grafting-from method, a polymerization initiating group which provides a starting point of the polymerization reaction is introduced into the base, and then the polymer chain is grown by grafting from the polymerization initiating group according to the aforementioned polymerization method. The polymerization initiating group is exemplified by halogenated alkyl group, and halogenated sulfonyl group. The polymerization initiating group is preferably bound physically or chemically to the surface of the base, from the viewpoint of precisely controlling the density of graft chains (graft density) and primary structure (molecular weight, molecular weight distribution, mode of monomer sequence) of the polymer chain obtainable by the graft polymerization. Method for introducing (bonding) the polymerization initiating group to the surface of the base is exemplified by chemical adsorption, and the Langmuir-Blodgett (LB) method.

For example, chlorosulfonyl group (polymerization initiating group) may be introduced to the surface of a silicon wafer (base) through a chemical bond, typically by allowing 2-(4-chlorosulfonylphenyl)ethyltrimethoxysilane or 2-(4-chlorosulfonylphenyl)ethyltrichlorosilane to react with an oxide layer on the surface of the silicon wafer.

Meanwhile, when introducing the polymerization initiating group by the LB method, a film forming material having the polymerization initiating group is dissolved in an appropriate solvent (for example, chloroform, benzene, etc.). Next, a small amount of this solution is spread over a clean liquid surface, preferably over a pure water surface, and the solvent is then allowed to evaporate, or allowed to disperse in an adjoining aqueous phase, thereby forming a low density film formed of a film forming molecules at the air-water interface. Next, a barrier plate is mechanically swept over the water surface to reduce the area of the water surface over which the film forming molecules are spread, thereby compressing the film to increase the density, and obtaining a dense monomolecular film at the air-water interface. Next, while keeping the surface density of the molecules that compose the monomolecular film at the air-water interface at constant under an appropriate condition, a base on which the monomolecular film will be accumulated is dipped or lifted in the direction crossing the monomolecular film at the air-water interface, to transfer the monomolecular film at the air-water interface onto the base, thereby accumulating the monomolecular layer on the base. Detail of the LB method may be understood with reference to "*New Experimental Chemistry* (in Japanese), Vol. 18 (*Interface and colloid*), Chapter 6, by Kiyonari Fukuda et al., (1977), Pub. by Maruzen", "*LB Film and Electronics* (in Japanese), Ed. by Kiyonari Fukuda, Michio Sugi and Hiroyuki Sasabe, (1986), Pub. by CMC", or "*Practical Technology for Making Good LB Film* (in Japanese), by Toshio Ishii, (1989), Pub. by Kyoritsu Shuppan".

When introducing the polymerization initiating group onto the surface of the base, it is preferable to treat the surface of the base by using a surface treatment agent having at least either a group bindable to the base or a group having affinity to the base, and at least either a group bindable to the polymerization initiating group or a group having affinity to the polymerization initiating group. The surface treatment agent may be either low molecular compound or high molecular compound. The surface treatment agent is exemplified by a compound typically represented by formula (10) below.

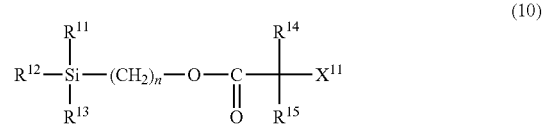

In formula (10), n represents an integer of 1 to 10, and more preferably represents an integer of 3 to 8. Each of $R^{11}$, $R^{12}$ and $R^{13}$ independently represents a substituent. At least one of $R^{11}$, $R^{12}$ or $R^{13}$ preferably represents an alkoxy group or a halogen atom, and all of $R^{11}$, $R^{12}$ and $R^{13}$ particularly preferably represent methoxy group or ethoxy group. Each of $R^{14}$ and $R^{15}$ independently represents a substituent. Each of $R^{14}$ or $R^{15}$ independently and preferably represents an alkyl group having 1 to 3 carbon atoms, or an aromatic functional group, and both of $R^{14}$ and $R^{15}$ most preferably represent methyl group. $X^{11}$ represents a halogen atom, which is preferably a bromine atom.

Also a silane coupling agent containing a polymerization initiating group (polymerization initiating group-containing silane coupling agent) is preferably used as the surface treatment agent. This enables the surface treatment and the introduction of the polymerization initiating group at the same time. The polymerization initiating group-containing silane coupling agent is exemplified by the compounds represented by formula (10). The polymerization initiating group-containing silane coupling agent and a method for producing thereof may be understood with reference to the description in WO2006/087839. The polymerization initiating group-containing silane coupling agent is specifically exemplified by (2-bromo-2-methyl) propionyloxyhexyl trimethoxysilane (BHM), and (2-bromo-2-methyl) propionyloxypropyl trimethoxysilane (BPM).

From the viewpoint of controlling the graft density, the polymerization initiating group-containing silane coupling agent used as the surface treatment agent is preferably used in combination with a polymerization initiating group-free silane coupling agent, such as known alkylsilane coupling agent. In this case, the graft density is freely adjustable, by controlling a ratio of the polymerization initiating group-containing silane coupling agent and the polymerization initiating group-free silane coupling agent. In an exemplary case where the silane coupling agent is entirely composed of the polymerization initiating group-containing silane coupling agent, the surface treatment with use thereof and subsequent graft polymerization based on the grafting-from method will yield the polymer chain grown with a surface occupancy exceeding 3%. Note that, in a case where the polymerization initiating group-containing silane coupling agent is used as the surface treatment agent, the polymerization initiating group-containing silane coupling agent may alternatively be used after hydrolyzed in the presence of water to silanol, and then partially condensed into the form of oligomer. More specifically, the oligomer may typically be adsorbed to a base made of silica or the like with the aid of hydrogen bond, and then dried to cause dehydration condensation, thus introducing the polymerization initiating group to the base.

(Other Methods for Production)

The polymer chain assemblage of the polymer brush may also be produced by a method for production described below. That is, the polymer chain assemblage may be produced by a method that includes: mixing an organic material for composing a base (also referred to as base polymer, hereinafter), with a plurality of block copolymers each having a polymer block A and a polymer block B having affinity to the base polymer smaller than that of the polymer block A, and having the polymer block A in at least two sites, in a solvent to prepare a mixed liquid; and removing the solvent from the mixed liquid to cause phase separation. This method for production can produce the polymer chain assemblage of the polymer brush in which both terminals of the polymer chain composing the polymer chain assemblage are immobilized onto the base as a carrier, to form a loop structure.

The organic material composing the base, which is the base polymer, is exemplified by those described previously, without special limitation.

The block copolymer may only be the one having the polymer block A and the polymer block B having affinity to the base polymer smaller than that of the polymer block A, and having the polymer block A in at least two sites, and is not specifically limited. The polymer block B used here is preferably incompatible with the base polymer, from the viewpoint that the loop structure will be properly formed. A more preferred combination is such that the polymer block B is incompatible with the base polymer, and the polymer block A is compatible with the base polymer.

Now the polymer block A is judged to be compatible with the base polymer, in the following case. That is, when a polymer solely composed of the polymer block A is mixed with the base polymer typically by heat melt blending or co-solution blending, the obtained mixture is solidified typically by cooling or solvent evaporation, and the thus obtained sample is subjected to measurement of glass transition temperature (Tg), the sample is determined to be compatible if the sample demonstrates a new Tg in a temperature range between Tg of the polymer solely composed of the polymer block A and Tg of the base polymer.

On the other hand, the polymer block B is judged to be incompatible with the base polymer, in the following case. That is, when a polymer solely composed of the polymer block B is mixed with the base polymer typically by heat melt blending or co-solution blending, the obtained mixture is solidified typically by cooling or solvent evaporation, and the thus obtained sample is subjected to measurement of glass transition temperature (Tg), the sample is determined to be incompatible if the sample demonstrates no Tg other than Tg of the polymer solely composed of the polymer block B and Tg of the base polymer 20.

Although the polymer block A and the polymer block B used here may only satisfy the aforementioned relation of compatibility with the base polymer, the polymer block A and the polymer block B preferably have SP values (solubility parameters) whose difference is preferably 1.5 $(MPa)^{0.5}$ or larger from the viewpoint of properly forming the loop structure, which is more preferably 3 $(MPa)^{0.5}$ or larger, and even more preferably 5 $(MPa)^{0.5}$ or larger. Difference between the SP value of the polymer block A and the SP value of the base polymer is preferably 0.5 $(MPa)^{0.5}$ or smaller, more preferably 0.3 $(MPa)^{0.5}$ or smaller, and even more preferably 0.2 $(MPa)^{o45}$ or smaller. Difference between the SF value of the polymer block B and the SP value of the base polymer is preferably 1.5 $(MPa)^{0.5}$ or larger, more preferably 3 $(MPa)^{0.5}$ or larger, and even more preferably 5 $(MPa)^{0.5}$ or larger. Note that, the SP values of the polymer block A and the polymer block B employed here may rely on those disclosed in "Polymer Handbook (4th Ed., Wiley-Interscience)".

The polymer block A may only be a substance that satisfies the aforementioned characteristics, and is selectable without special limitation while taking the base polymer to be used into consideration. Specific examples thereof include those composed of a polymer segment that composes the resin or rubber having been exemplified as the resin or rubber composing the aforementioned base polymer.

Molecular weight (weight average molecular weight (Ma)) of the polymer block A moiety of the block copolymer is preferably, but not specifically limited to, 1,000 to 100,000 from the viewpoint that the polymer block A can sufficiently interact with the base polymer, and can therefore support the loop structure formed by the polymer block B more properly to enhance the durability. The molecular weight is more preferably 1,000 to 50,000, even more preferably 1,000 to 20,000, yet more preferably 2,000 to 20,000, and particularly preferably 2,000 to 6,000.

For the polymer block B, preferably used is any of those explained as the aforementioned polymer chains that satisfy the aforementioned properties in relation to the base polymer.

The solvent used for mixing therein the base polymer and a plurality of block copolymer chains is not specifically limited, allowing use of any solvent so far as it can dissolve or disperse therein the base polymer and the block copolymer chains. The solvent is exemplified by aliphatic hydrocarbons such as n-pentane, n-hexane, and n-heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; aromatic hydrocarbons such as benzene, toluene, xylene, and mesitylene; nitrogen-containing hydrocarbons such as nitromethane, nitrobenzene, acetonitrile, propionitrile, and benzonitrile; ethers such as diethyl ether, tetrahydrofuran, and dioxane; ketones such as acetone, ethyl methyl ketone, methyl isobutyl ketone, cyclopentanone, and cyclohexanone; esters such as methyl acetate, ethyl acetate, ethyl propionate, and methyl benzoate; halogenated hydrocarbons such as chloroform, dichloromethane, 1,2-dichloroethane, chlorobenzene, dichlorobenzene, and trichlorobenzene; and alcohols such as methanol and ethanol.

The mixed liquid is obtainable by mixing the base polymer with the plurality of block copolymer chains in such solvent for dissolution or dispersion. Next, the thus obtained mixed liquid is cast or spin-coated to form a film, and the solvent is removed from the film formed of the mixed liquid. As the solvent is removed, a part of the plurality of block copolymer chains, having been dispersed in the base polymer with the aid of the solvent, changes into a state in which the polymer block A remains compatible with the base polymer, meanwhile the polymer block B composing the block copolymer chains causes phase separation from the base polymer, so that the polymer block A remains in the base polymer, and the polymer block B exposes from the base polymer. Hence the polymer chain that composes the polymer chain assemblage is immobilized at both terminals on the carrier, to form the loop structure.

Although method for removing the solvent is selectable, without special limitation, depending on types of the solvent to be used, preferred is a method that relies upon heating at 50° C. to 100° C., and more preferred is a method that relies upon heating at 70 to 80° C.

The polymer chain assemblage of the polymer brush may still alternatively be produced by the following method for preparation. That is, the base polymer is mixed with the plurality of block copolymers each having the polymer block A and the polymer block B having affinity to the base polymer smaller than that of the polymer block A, and having the polymer block A in at least two sites, under heating to prepare a melt mixture; and cooling the melt mixture to cause phase separation. Also this method for production successfully produces the polymer chain assemblage of the polymer brush having the loop structure in which each polymer chain that composes the polymer chain assemblage is immobilized at both terminals on the base as the carrier.

Heating temperature at which the base polymer is mixed with the plurality of block copolymers under heating to prepare the melt mixture is not specifically limited, and may only be a temperature at which the base polymer or the block copolymer can melt, and may preferably be a temperature at which both the base polymer and the block copolymer can melt. The heating temperature is preferably 40 to 300° C., and more preferably 80 to 200° C.

The thus obtained melt mixture is then cast, or spin-coated, or dip-coated to form a film, and then cooled for solidification, during which the phase separation is allowed to occur. In the process that the melt mixture changes from the molten state to the solid state, a part of the plurality of block copolymers, having been dispersed in the base polymer as a result of melt mixing, changes into a state in which the polymer block A remains compatible with the base polymer, meanwhile the polymer block B composing the block copolymer chain causes phase separation from the base polymer, so that the polymer block A remains in the base polymer, and the polymer block B exposes from the base polymer. The loop structure may be thus formed.

Method for cooling the melt mixture is not specifically limited, and is exemplified by a method for allowing the melt mixture in the form of film to stand still at room temperature, and a method for allowing the melt mixture to stand still while heating it at a temperature lower than melting temperatures of the individual components that compose the melt mixture.

(Number Average Molecular Weight and Polydispersity Index of Polymer Chain)

The polymer chain that composes the polymer chain assemblage preferably has a number average molecular weight ($M_n$) of 500 to 10,000,000, which is more preferably 100,000 to 10,000,000.

The polymer chain assemblage preferably has a polydispersity index (PDI=$M_w/M_n$) of 1.0 to 2.0, which is more preferably 1.0 to 1.5.

The number average molecular weight (M) and the polydispersity index ($M_w/M_n$) of the polymer chain assemblage may be measured by treating the base with hydrofluoric acid to extract the polymer chain, and by subjecting the extracted polymer chain to size exclusion chromatography such as gel permeation chromatography to analyze the molecular weight.

In a case where the polymer chain assemblage was formed by graft polymerization, the number average molecular weight (Ma) and the polydispersity index ($M_w/M_n$) of a free polymer, which produces during the polymerization reaction of the polymer chains, may be measured by size exclusion chromatography, and the measured values may be diverted to the number average molecular weight ($M_n$) and the polydispersity index ($M_w/M_n$) of the polymer chain, assuming that the free polymer has the same molecular weight as the polymer chain to be immobilized on the base. The present inventors have confirmed that the polymer chain to be immobilized on the base and the free polymer produced during the polymerization reaction demonstrate almost same values both for the number average molecular weight ($M_n$) and the polydispersity index ($M_w/M_n$).

A method for measuring the molecular weight with use of the free polymer will be specifically explained. Upon addition of a free radical initiator to a polymerization liquid, in surface-initiated living radical polymerization for synthesizing the polymer chain, obtainable is a free polymer whose molecular weight and the molecular weight distribution are equivalent to those of the polymer chains that compose the polymer chain assemblage. The free polymer is analyzed by the size exclusion chromatography, to determine the number average molecular weight ($M_n$) and the polydispersity index ($M_w/M_n$).

Analysis based on the size exclusion chromatography may be based on a calibration method with use of available monodisperse standard samples of the same kind with known molecular weights, or based on absolute evaluation of molecular weight with use of a multi-angle light scattering detector. In this patent specification, values of the number average molecular weight (Mn) and the weight average molecular weight (Mw) are represented by absolute values properly determined with use of the multi-angle light scattering detector and analytical curves of molecular weight obtained from various standard samples. The standard samples are exemplified by polystyrene standard sample, polymethyl methacrylate standard sample, and polyethylene glycol standard sample.

Density of the polymer chain on the surface of the support is preferably 0.01 chains/nm$^2$ or larger, more preferably 0.05 chains/nm$^2$ or larger, and even more preferably 0.1 chains/nm$^2$ or larger.

The density of the polymer chain may be determined by the equation below, after measuring the amount of grafting per unit area (W) and the number average molecular weight ($M_n$) of the polymer chain assemblage.

Density of polymer chain (chains/nm$^2$)

$$=W(g/nm^2)/M_n \times (\text{Avogadro'S number})$$

In the equation, W represents the amount of grafting per unit area, and $M_n$ represents the number average molecular weight of the polymer chain assemblage.

The amount of grafting per unit area (W), on a support in the form of flat substrate such as silicon wafer, may be determined by ellipsometry of the dry film thickness, that is, the thickness of the polymer chain assemblage layer in the dry state, and by calculation also with use of the density of bulk film.

The number average molecular weight ($M_n$) of the polymer chain assemblage may be measured by the aforementioned method.

The surface occupancy of the polymer chain on the surface of the support (cross sectional area of polymer× density of polymer chain×100) is preferably 1% or larger, more preferably 5% or larger, and even more preferably 10% or larger. The surface occupancy means percentage of the surface of the support occupied by the graft point (first structural unit), and reaches 100% under closest packing. The density of the polymer chain may be calculated on the basis of the measurement by the aforementioned method. The cross sectional area of the polymer may be determined with use of the length of the repeating unit of the polymer in the most stretched form, and the bulk density of the polymer.

[B] Polymer Having Bottle-Brush Structure

Next, the polymer having a bottle-brush structure will be explained.

The bottle-brush structure means a branched polymer structure in which a plurality of side chains are branched from a principal chain, to give a shape of bottle-brush as a whole. The polymer having the bottle-brush structure, whose polymer chain in the principal chain composing the base, and whose side chains composing the polymer chain assemblage, may alternatively be immobilized typically on a support.

Also the polymer having the bottle-brush structure is obtainable by graft polymerization. The graft polymerization is enabled by the grafting-to method in which a preliminarily synthesized reactive side chain (graft chain) is bonded to a trunk polymer which serves as the principal chain; the grafting-from method in which the side chain (graft chain) is grown from a polymerization initiating group of a macro-initiator (trunk polymer having a polymerization initiating group introduced therein); or the grafting-through method in which the macromonomer (polymer having a polymerizable functional group at the terminal of a side chain-forming polymer). These side chains and trunk polymer may also be synthesized by living anionic polymerization, ring-opening metathesis polymerization (RCMP), or living radical polymerization (LRP) that is highly versatile. Preferred example of the polymer having the bottle-brush structure is exemplified by a compound represented by formula (11).

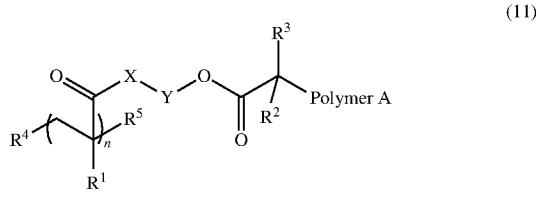

(11)

In formula (11), each of $R^1$ and $R^2$ independently represents a hydrogen atom or methyl group, and $R^3$ represents a substituent, which is preferably an alkyl group having 1 to 10 carbon atoms. Each of $R^4$ and $R^5$ represents a terminal group composed of an atom or an atomic group, and is exemplified by hydrogen atom, halogen, or functional group derived from the polymerization initiator. X represents O or NH, Y represents a divalent organic group, n represents an integer of 10 or larger, and Polymer A represents a polymer chain. In the compound represented by formula (11), a repeating structure of a structural unit contained in n parentheses corresponds to the principal chain of the bottle-brush structure, and Polymer A corresponds to the side chain of the bottle-brush structure.

The organic group represented by Y is exemplified by alkylene group having 1 to 10 carbon atoms, oxyalkylene group (RO) having 1 to 5 carbon atoms (R represents an alkylene group having 1 to 5 carbon atoms), linkage structure having a plurality of oxyalkylene groups linked therein, and, divalent organic group composed of combination of at least two of these organic groups (alkylene group having 1 to 10 carbon atoms, oxyalkylene group having 1 to 5 carbon atoms, and linkage structure of oxyalkylene groups). Now the alkylene group, and alkylene group in the oxyalkylene group may have straight, branched, or cyclic structure. The alkylene group is specifically exemplified by ethylene group, propylene group, butylene group, and cyclohexylene group. The alkylene group, and the alkylene group in the oxyalkylene group may have a substituent. The substituent is exemplified by alkyl group having 1 to 10 carbon atoms, aryl group having 6 to 40 carbon atoms, and heteroaryl group having 3 to 40 carbon atoms. Each of these substituents may further be substituted by a substituent. Description of Polymer A, preferred range, and specific examples may be understood with reference to the aforementioned paragraphs titled "(Polymer Chain)". Polymer A may be same or different, among the structural units of the principal chain.

Assuming that the polymer having the bottle-brush structure has the principal chain aligned to the center axis, and that tips of the side chains (graft chains) extended straight from the center axis forms an envelope face (virtual circumference), then the polymer is understood to have a cylindrical external profile whose side face is formed of the envelope face of the tips. The polymer having such external profile will have smaller density of the side chains (graft chains) on the side face, as the side chains (graft chains) become longer, thus increasing the degree of structural freedom of the side chains (graft chains). Hence, the side chains (graft chains) become freely foldable.

In the polymer having the bottle-brush structure, the surface occupancy ($\sigma^*$) by the side chains is given by equation (1) below.

$\sigma^*$=Volume per repeating unit in side chain moiety $[nm^3]$/Length of repeating unit in side chain moiety$[nm]\times\sigma$[chains/$nm^2$]$\times 100$     (1)

In equation (1), $\sigma$ represents the density of the side chains on the virtual circumference determined by the equation (2) below, and volume per repeating unit in the side chain moiety ($V_0$ [$nm^3$])) is given by equation (3) below.

$$\sigma = \frac{1}{(2\pi \times \alpha \times \text{Degree of polymerization in side chain moiety})\left(\frac{\alpha}{\text{Graft efficiency}}\right)} \quad (2)$$

$$V_0 = \frac{\text{Molecular weight of monomer in side chain moiety/Avogadro's number}}{(\text{Bulk density of monomer in side chain moiety})} \quad (3)$$

In equation (2), $\alpha$ represents length of the repeating unit in the principal chain and the side chain moiety.

Since the density ($\sigma$) of the side chains determined by equation (2) represents the number of side chains per unit area on the side face of the polymer, so that the surface occupancy ($\sigma^*$) by the side chains determined by equation (1) represents a value that indicates area percentage of the side face of the polymer occupied by the tips of the side chains that are stretched straight and vertically from the principal chain. The surface occupancy ($\sigma^*$) by the side chains ranges from 0 to 100%, wherein the larger the value, the larger the area percentage of the side face of the polymer occupied by the tips of the side chains, meaning that the degree of freedom of the side chains is limited. That is, the surface occupancy by the side chains is a value that correlates to the degree of freedom of the side chains, wherein the larger the surface occupancy ($\sigma^*$) by the side chains, more largely the degree of structural freedom is limited. Hence, the side chains may be kept stretched nearly vertically from the principal chain, and can therefore demonstrate properties unique to the structure.

The surface occupancy by the side chains of the polymer having the bottle-brush structure is preferably 1% or larger, more preferably 5% or larger, and even more preferably 10% or larger.

The density of the side chains of the polymer having the bottle-brush structure is preferably 0.01 chains/$nm^2$ or larger, more preferably 0.05 chains/$nm^2$ or larger, and even more preferably 0.1 chains/$nm^2$ or larger.

The number average molecular weight of the polymer having the bottle-brush structure is preferably 1,000 to 10,000,000, more preferably 1,000 to 1,000,000, and even more preferably 5,000 to 500,000.

The polydispersity index (PDI=$M_w/M_n$) of the polymer having the bottle-brush structure is preferably 1.0 to 2.0, and more preferably 1.0 to 1.5.

[Swelling Liquid]

Next, the swelling liquid contained in the brush layer will be explained. The swelling liquid is properly selectable depending on types of the polymer chain assemblage that constitutes the brush layer. The swelling liquid may be hydrophilic liquid or hydrophobic liquid. The swelling liquid is preferably a liquid having high affinity to the polymer chain assemblage that composes the brush layer.

The affinity of the swelling liquid contained in the brush layer, to the polymer chain assemblage, is preferably higher than the affinity of the lubricating liquid to the polymer chain assemblage. This mode can also suppress degree of swelling of the brush layer from degrading with time, making it possible to maintain excellent lubrication performance and so forth for long period. Now "the affinity of the swelling liquid to the polymer chain assemblage is higher than the affinity of the lubricating liquid to the polymer chain assemblage" means that the swelling liquid can demonstrate a degree of swelling of the polymer chain assemblage, larger than that demonstrated by the lubricating liquid.

Ratio (swelling degree 2/swelling degree 1) of the degree of swelling of the brush layer achieved by the swelling liquid (swelling degree 2), to the degree of swelling of the brush layer achieved by the lubricating liquid (swelling degree 1), is preferably 1.01 or larger, more preferably 1.05 or larger, even more preferably 1.1 or larger, and particularly preferably 1.5 or larger. The degree of swelling of the brush layer is defined as follows.

Degree of swelling of brush layer
=(thickness of brush layer after swollen with sample liquid)/(dry thickness of brush layer)

The swelling liquid is specifically exemplified by water, ionic liquid, deep eutectic solvent, mineral oil (paraffinic mineral oil, naphthenic mineral oil, etc.), hydrocarbon-based oil (polybutene, poly-α-olefin (PAO), alkylbenzene, alkylnaphthalene, etc.), polyol ester (POE), silicone oil, fluorine-containing solvent, and mixture of these liquids.

The swelling liquid may be composed of only one kind of liquid, or may be a mixture of two or more kinds of liquid. The swelling liquid may also contain an additive. The additive is exemplified by surfactant.

The ionic liquid is an ion-conductive, low-melting-point salt, also called ambient temperature molten salt. Many of the ionic liquid are based on combination of an organic onium ion as a cation, and an organic or inorganic anion as an anion, thus demonstrating relatively low melting point. The melting point of the ionic liquid is usually 100° C. or lower, and is preferably room temperature (25° C.) or lower. The melting point of the ionic liquid may be measured typically with use of a differential scanning calorimeter (DSC).

A compound represented by formula (20) below may be used as the ionic liquid. The ionic liquid preferably has a melting point of 50° C. or lower, which is more preferably 25° C. or lower.

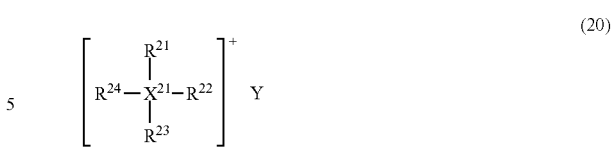

(20)

In formula (20), each of $R^{21}$, $R^{22}$, $R^{23}$ and $R^{24}$ independently represents an alkyl group having 1 to 5 carbon atoms, or an alkoxyalkyl group given by R'—O—$(CH_2)_n$—, R' represents a methyl group or an ethyl group, and n represents an integer of 1 to 4. $R^{21}$, $R^{22}$, $R^{23}$ and $R^{24}$ may be same or different. Any two of $R^{21}$, $R^{22}$, $R^{23}$ and $R^{24}$ may bond with each other to form a cyclic structure, where at least one of $R^{21}$, $R^{22}$, $R^{23}$ or $R^{24}$ represents an alkoxyalkyl group. $X^{21}$ represents a nitrogen atom or a phosphorus atom, and Y represents a monovalent anion.

The alkyl group having 1 to 5 carbon atoms, represented by $R^{21}$, $R^{22}$, $R^{23}$ or $R^{24}$, is exemplified by methyl group, ethyl group, n-propyl group, 2-propyl group, n-butyl group, and n-pentyl group.

The alkoxyalkyl group represented by $R^{21}$, $R^{22}$, $R^{23}$ or $R^{24}$, and is specifically given by R'—O—$(CH_2)_n$—, is preferably methoxymethyl group or ethoxymethyl group, 2-methoxyethyl group or 2-ethoxyethyl group, 3-methoxypropyl group or 3-ethoxypropyl group, 4-methoxybutyl group or 4-ethoxybutyl group, and so forth.

The compound having a cyclic structure, formed by bonding any two of $R^{21}$, $R^{22}$, $R^{23}$ or $R^{24}$, while having a nitrogen atom for $X^{21}$, is preferably quaternary ammonium salt and so forth, typically having an aziridine ring, azetidine ring, pyrrolidine ring, or piperidine ring; meanwhile, while having a phosphorus atom for $X^{21}$, such compound is preferably quaternary phosphonium salt and so forth, typically having a pentamethylenephosphine (phosphorinane) ring. The quaternary ammonium salt preferably has, as the substituent, at least one 2-methoxyethyl group whose R' represents a methyl group, and n represents 2.

The monovalent anion represented by Y is exemplified by $BF_4^-$, $PF_6^-$, $AsF_6^-$, $SbF_6^-$, $AlCl_4^-$, $NbF_6^-$, $HSO_4^-$, $ClO_4^-$, $CH_3SO_3^-$, $CF_3SO_3^-$, $CF_3CO_2^-$, $(CF_3SO_2)_2N^-$, $Cl^-$, $Br^-$, and $I^-$, among them preferred are $BF_4^-$, $PF_6^-$, $(CF_3SO_2)_2N^-$, $CF_3SO_3^-$, or $CF_3CO_2^-$.

The ionic liquid preferably used is a compound having, in formula (20), a methyl group for $R^{21}$, an ethyl group for each of $R^{23}$ and $R^{24}$, and an alkoxyalkyl group given by R'—O—$(CH_2)_n$— for $R^{24}$.

Among compounds represented by formula (20), preferably used are quaternary ammonium salt and quaternary phosphonium salt specifically exemplified as below.

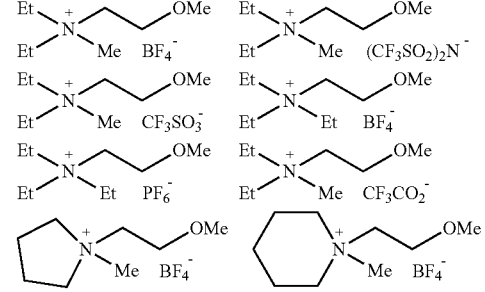

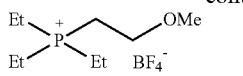

Also ionic liquid containing imidazolium ion, or ionic liquid containing aromatic cation may be used as the ionic liquid.

Method for swelling the brush layer with the swelling liquid is exemplified by, but not specifically limited to, a method in which the swelling liquid is coated on the surface of a layer which is formed on a member and contains the polymer chain assemblage, and then allowed to stand still; and a method in which a member having formed thereon a layer that contains a molecular chain assemblage is dipped in the swelling liquid.

<<Lubricating Liquid>>

The material of this invention has the lubricating liquid formed on the surface of the brush layer. As illustrated in FIG. 1, the swelling liquid contained in the brush layer and the lubricating liquid on the brush layer are phase-separated in the material of this invention, forming on the brush layer the liquid-liquid phase separation interface between the swelling liquid and the lubricating liquid.

The lubricating liquid used here is the one capable of causing phase separation from the swelling liquid to form the liquid-liquid phase separation interface. The lubricating liquid is specifically exemplified by water, ionic liquid, deep eutectic solvent, mineral oil (paraffinic mineral oil, naphthenic mineral oil, etc.), hydrocarbon-based oil (polybutene, poly-α-olefin (PAO), alkylbenzene, alkylnaphthalene, etc.), polyol ester (POE), silicone oil, fluorine-containing solvent, and mixtures of these liquids. The lubricating liquid may be composed of only one kind of liquid, or may be a mixture of two or more kinds of liquid. The lubricating liquid may also contain an additive. The additive is exemplified by surfactant and friction modifier. The friction modifier is exemplified by fatty acid such as oleic acid.

The lubricating liquid is preferably a liquid incompatible with the swelling liquid contained in the brush layer. This mode makes it easier to form clearer liquid-liquid phase separation interface more easily on the brush layer, and can more largely decrease the friction coefficient during sliding against the opposing member. This also makes it possible to suppress the degree of swelling of the brush layer from degrading with time, making it possible to maintain excellent lubrication performance for long period. Now, a case where the lubricating liquid is incompatible with the swelling liquid in this patent specification involves not only a case where the lubricating liquid does not dissolve in the swelling liquid at all, but also a case where it slightly dissolves in the swelling liquid. In a case where the lubricating liquid is incompatible with the swelling liquid, solubility of the swelling liquid to the lubricating liquid at 23° C. is preferably 1.00% by mass or smaller, more preferably 0.50% by mass or smaller, even more preferably 0.10% by mass or smaller, yet more preferably 0.05% by mass or smaller, and furthermore preferably 0.01% by mass or smaller.

The lubricating liquid preferably contains liquid 1 which is different from the swelling liquid, and liquid 2 which is a base liquid of the swelling liquid. With such lubricating liquid, the material can replenish the liquid 2, which is a lubricating liquid component, from the lubricating liquid to the brush layer, even if the lubricating liquid were drained off from the brush layer typically due to compression during sliding, and can therefore suppress the degree of swelling of the brush layer from degrading with time, making it possible to maintain excellent lubrication performance for long period. Now, the base liquid of the swelling liquid in this patent specification means a liquid whose content is largest of all components contained in the swelling liquid. The base liquid of the swelling liquid may be composed of only one kind of liquid, or may be a mixed liquid of two or more kinds of liquid.

Preferred modes of the lubricating liquid that contains the liquid 1 which is different from the swelling liquid, and the liquid 2 which is the base liquid of the swelling liquid, are exemplified by mode 1 and mode 2 below.

Mode 1: a lubricating liquid having the liquid 2, which is the base liquid of the swelling liquid, dissolved up to saturation in the liquid 1 which is different from the swelling liquid.

Mode 2: an emulsion type lubricating liquid having the liquid 2, which is the base liquid of the swelling liquid, dispersed in the liquid 1, which is different from the swelling liquid and is incompatible with the swelling liquid.

In the lubricating liquid of mode 1, solubility of the liquid 2 in the liquid 1 at 23° C. is preferably 5.00% by mass or smaller, more preferably 3.00% by mass or smaller, and even more preferably 2.00% by mass or smaller. The lower limit may be 0.01% by mass or above, and also may be 0.05% by mass or above.

In the lubricating liquid of mode 2, solubility of the liquid 2 to the liquid 1 at 23° C. is preferably 3.00% by mass or smaller, more preferably 2.00% by mass or smaller, even more preferably 1.00% by mass or smaller, yet more preferably 0.50% by mass or smaller, furthermore preferably 0.10% by mass or smaller, and particularly preferably 0.05% by mass or smaller.

The lubricating liquid of mode 2 further preferably contains a surfactant. This mode can stabilize the emulsion.

<Lubricating System>

Next, the sliding system of this invention will be explained.

The sliding system of this invention has a member with a sliding face, and an opposing member arranged opposed to the sliding face of the member, the sliding system having, on the member with the sliding face, a brush layer containing a brush-like polymer chain assemblage formed of a plurality of polymer chains and a swelling liquid, being swollen with the swelling liquid, and retaining, between the brush layer and the opposing member, a lubricating liquid, and, the swelling liquid contained in the brush layer and the lubricating liquid being phase-separated to form a liquid-liquid phase separation interface in between.

The brush layer and lubricating liquid are synonymous to those described previously.

The member with the sliding face is not specifically limited, and is properly selectable depending on applications exemplified by bearing, cam, valve lifter, follower, shim, valve, valve guide, cylinder liner, piston, piston ring, piston pin, crank shaft, gear, rotor, rotor housing, valve, valve guide, and pump.

The opposing member is properly selectable depending on applications without special limitation. The opposing member may have, formed on the surface thereof, a layer of the brush-like polymer chain assemblage composed of a plurality of polymer chains containing the swelling liquid; or a layer with a polymer network structure containing the swelling liquid. The swelling liquid contained in the layers thus formed on the surface of the opposing member may be same as the lubricating liquid, or may be different from the lubricating liquid. The opposing member may further have, arranged thereon, a gel film that contains the lubricating liquid. The gel film may be arranged between the member with the sliding face, and the opposing member.

The gel film is exemplified by a material obtained by swelling, with a liquid, a film that contains the polymer having the bottle-brush structure and a reinforcing filler. The polymer having the bottle-brush structure is exemplified by those described previously. The liquid contained in the gel film is exemplified by those described previously in the paragraphs titled "Lubricating Liquid" and "Swelling Liquid". The reinforcing filler is exemplified by fibrous substance, non-porous inorganic material, and substance having a three-dimensional polymer network structure. The fibrous substance is a substance composed of a fiber assemblage. Fiber that composes the fiber assemblage may be any of cellulose, fibrous protein, mineral fiber, inorganic filler, synthetic fiber, carbon fiber, or carbon nanotube, which is preferably cellulose, fibrous protein, or synthetic fiber in terms of flexibility, and is more preferably cellulose. Cellulose is preferably cellulose nanofiber (cellulose fiber having a diameter of 1 to 500 nm). The cellulose nanofiber is exemplified by those derived from plant such as wood, and those derived from bacteria. The plant-derived cellulose nanofiber is highly practical for its larger productivity and low cost. The fiber derived from whichever source may be suitably used so long as it has a network structure in which the fibers entangle, can swell with impregnated liquid to gelate, and can retain the network structure after gelated. The substance having a three-dimensional polymer network structure is exemplified by a substance formed of a polymer in which a crosslinked structure is formed among a plurality of polymer chains to construct a three-dimensional network structure. The non-porous inorganic material is exemplified by silica, alumina, calcium carbonate, carbon black, nanocarbon material (graphene, etc.), clay, and pyrosilicate.

The sliding system is specifically exemplified by wheel driving unit for vehicle and so forth, axle driving system for electric motor, compressor, and loudspeaker.

EXAMPLES

This invention will further be detailed referring to Examples. All materials, amounts of consumption, proportions, processing details, processing procedures and so forth explained in Examples below are properly modifiable, without departing from the spirit of this invention. The scope of this invention is therefore not limited to the specific examples described below.

(Exemplary Manufacture 1) Manufacture of Test Specimen 1

In a fluororesin vessel under an inert gas atmosphere, placed were 30.9 g of methyl methacrylate (MMA, hereinafter), 0.000301 g of ethyl-2-bromo-2-methylpropionate (EBIB, hereinafter), 0.144 g of copper(I) bromide (Cu(I)Br, hereinafter), 0.0248 g of copper(II) bromide (Cu(II) $Br_2$, hereinafter), 0.909 g of 4,4'-dinonyl-2,2'-bipyridyl (dN bipy, hereinafter), and 32.0 g of anisole, which were then mixed. Next, a glass disk (OPB-30C01-1, from Sigmakoki Co., Ltd.) having immobilized on the surface thereof (2-bromo-2-methyl) propionyloxypropyltrimethoxysilane (BPM, hereinafter), or a silicon disk, was placed in the vessel. The vessel was then sealed, covered with an aluminum bag, placed in a high-pressure reaction vessel, and kept at 400 MPa, 60° C. for 5 hours for polymerization. Upon completion of the polymerization, the disk was taken out from the vessel, and washed with tetrahydrofuran by using a shaker. The disk was then dried, to obtain a test specimen 1 having formed on the surface of the disk, a polymer chain assemblage (polymer brush layer) formed of a brush-like polymethyl methacrylate (R 4) and composed of a plurality of polymer chains. Conversion rate of polymerization was found to be 13%. The conversion rate was estimated by $^1$H-NMR (ECS400, from JEOL Ltd., with chloroform-dl).

The polymer brush layer formed on the surface of the disk was found to have a dry thickness of 830 nm, a number average molecular weight of 1,980,000, a polydispersity index (PDI) of 1.28, a polymer chain density of 0.30 chains/$nm^2$, and a surface occupancy of the polymer chain of 17%. The dry thickness of the polymer brush layer was measured by spectral ellipsometry with use of an ellipsometer. The number average molecular weight and the polydispersity index of the polymer brush layer were measured by gel permeation chromatography, with use of tetrahydrofuran as an eluent, and a multi-angle light scattering detector and a differential refractometer as detectors.

(Exemplary Manufacture 2) Manufacture of Test Specimen 2

Test specimen 2 was obtained according to the same procedures as in Exemplary Manufacture 1, by forming, on the surface of the disk, the polymer chain assemblage (polymer brush layer) formed of a brush-like polymethyl methacrylate (PMMA) and composed of a plurality of polymer chains. The polymer brush layer formed on the surface of the disk was found to have a dry thickness of 717 nm.

(Exemplary Manufacture 3) Manufacture of Test Specimen 3

In a fluororesin vessel under an inert gas atmosphere, placed were 30.9 g of MMA, 0.140 g of Cu(I)Br, 0.0298 g of Cu(II)$Br_2$, 0.909 g of dNbipy, and 32.0 g of anisole, which were then mixed. Next, a glass disk (OPB-30C01-1, from Sigmakoki Co., Ltd.) having BPM immobilized on the surface thereof was placed in the vessel. The vessel was then sealed, covered with an aluminum bag, placed in a high-pressure reaction vessel, and kept at 400 MPa, 60° C. for 10 hours for polymerization. Upon completion of the polymerization, the disk was taken out from the vessel, and washed with tetrahydrofuran by using a shaker. The disk was then dried, to obtain a test specimen 3 having formed on the surface of the disk, a polymer chain assemblage (polymer brush layer) formed of a brush like polymethyl methacrylate (RNA) and composed of a plurality of polymer chains. Conversion rate of polymerization was found to be 13%. The polymer brush layer formed on the surface of the disk was found to have a dry thickness of 1556 nm.

(Exemplary Manufacture 4) Manufacture of Test Specimen 4

In a fluororesin vessel under an inert gas atmosphere, placed were 72.5 g of MMA, 0.00706 g of EBIB, 0.336 g of Cu(I)Br, 0.0582 g of Cu(II)$Br_2$, 2.13 g of dNbipy, and 75.0 g of anisole, which were then mixed. Next, a glass disk (OPB-30C01-1, from Sigmakoki Co., Ltd.) having BPM immobilized on the surface thereof was placed in the vessel. The vessel was then sealed, covered with an aluminum bag, placed in a high-pressure reaction vessel, and kept at 400 MPa, 60° C. for 4 hours for polymerization. Upon completion of the polymerization, the glass disk was taken out from the vessel, and washed with tetrahydrofuran by using a shaker. The glass disk was then dried, to obtain a test specimen 4 having formed on the surface of the glass disk, a polymer chain assemblage (polymer brush layer) formed of a brush-like polymethyl methacrylate (PIMA) and composed of a plurality of polymer chains. Conversion rate of polymerization was found to be 10%. The polymer brush layer formed on the surface of the glass disk was found to have a dry thickness of 778 nm, a number average molecular weight of 2,080,000, and a polydispersity index (PDI) of 1.34.

(Exemplary Manufacture 5) Manufacture of Test Specimen 5

In a fluororesin vessel under an inert gas atmosphere, placed were 29.0 g of MMA, 0.00282 g of EBIB, 0.135 g of Cu(I)Br, 0.0233 g of Cu(II) Br$_2$, 0.852 g of d bipy, and 30.0 g of anisole, which were then mixed. Next, a glass lens (diameter=10 mm, radius of curvature=6 mm, SLB-10, from Sigmakoki Co., Ltd.) having BPM immobilized on the surface thereof was placed in the vessel. The vessel was then sealed, covered with an aluminum bag, placed in a high-pressure reaction vessel, and kept at 400 MPa, 60° C. for 4 hours for polymerization. Upon completion of the polymerization, the glass lens was taken out from the vessel, and washed with tetrahydrofuran by using a shaker. The glass lens was then dried, to obtain a test specimen 5 having formed on the surface of the glass lens, a polymer chain assemblage (polymer brush layer) formed of a brush like polymethyl methacrylate (FNMA) and composed of a plurality of polymer chains. Conversion rate of polymerization was found to be 17%. The polymer brush layer formed on the surface of the glass lens was found to have a dry thickness of 988 nm, a number average molecular weight of 2,110,000, and a polydispersity index (PDI) of 1.36. Note that the dry thickness of the polymer brush layer on the surface of the glass lens employed here relies on a value of the dry thickness of the polymer brush layer on the glass disk formed by polymerization under the same conditions as described previously.

(Exemplary Manufacture 6) Manufacture of Test Specimen 6

A glass lens (diameter=10 mm, radius of curvature=6 mm, SLB-10, from OptoSigma) was cleaned under sonication sequentially in acetone for 30 minutes, in chloroform for 30 minutes and in 2-propanol for 30 minutes, and then irradiated on the surface thereof with UV ozone for 10 minutes. Next, the glass lens was immersed in a mixed liquid of (2-bromo-2-methyl) propionyloxypropyltrimethoxysilane (BPM)/ethanol/ammonia water=1/89/10 (ratio by mass) for 24 hours, to introduce a polymerization initiating group onto the surface of the glass lens. Next, in a fluororesin vessel under an inert gas atmosphere, placed were 79.4 g of methoxypoly(ethylene glycol) methacrylate (from Aldrich, code 447943, number average molecular weight=500) (PEGMA, hereinafter), 0.000155 g of EBIB, 0.0788 g of Cu(I)Br, 0.0051 g of Cu(II)Br$_2$, 0.514 g of diNbip, and 80.0 g of anisole, which were then mixed. The vessel was then sealed, covered with an aluminum bag, placed in a high-pressure reaction vessel, and kept at 400 MPa, 60° C. for 3 hours for polymerization. Upon completion of the polymerization, the glass lens was taken out from the vessel, and washed with tetrahydrofuran by using a shaker. The glass lens was then dried, to obtain a test specimen 6 having formed on the surface of the glass lens, a polymer chain assemblage (polymer brush layer) composed of a plurality of polymer chains. The polymer brush layer formed on the surface of the glass lens was found to have a dry thickness of 461 nm, a number average molecular weight of 2,690,000, and a polydispersity index (PDI) of 1.12. Note that the dry thickness of the polymer brush layer on the surface of the glass lens employed here relies on a value of the dry thickness of the polymer brush layer on the glass disk formed by polymerization under the same conditions as described previously.

(Exemplary Manufacture 7) Manufacture of Test Specimen 7

Test specimen 7 was obtained according to the same procedures as in Exemplary Manufacture 1, by forming, on the surface of the glass disk, the polymer chain assemblage (polymer brush layer) formed of a brush-like polymethyl methacrylate (PMMA) and composed of a plurality of polymer chains. The polymer brush layer formed on the surface of the disk was found to have a dry thickness of 568 nm, a polymer chain density of 0.24 chains/nm$^2$, and a surface occupancy by the polymer chain of 14%.

(Exemplary Manufacture 8) Manufacture of Test Specimen 8

Test specimen 8 was obtained according to the same procedures as in Exemplary Manufacture 1, by forming, on the surface of the glass disk, the polymer chain assemblage (polymer brush layer) formed of a brush-like polymethyl methacrylate (PMMA) and composed of a plurality of polymer chains. The polymer brush layer formed on the surface of the disk was found to have a dry thickness of 707 nm, a polymer chain density of 0.30 chains/nm$^2$, and a surface occupancy by the polymer chain of 17%.

Test Example 1

A liquid (swelling liquid) used for swelling the polymer brush layer was N-(2-methoxyethyl)-N-methylpyrrolidinium bis(trifluoromethanesulfonyl)imide (MEMP-TFSI), which is an ionic liquid.

The swelling liquid was coated over the surface of the polymer brush layer of the test specimen 2, to swell the polymer brush layer with the swelling liquid. The solvent was then removed with use of an air duster, and the thickness of the polymer brush layer was measured with an ellipsometer. The polymer brush layer after swollen with the ionic liquid was found to be 1783 nm (2.49-fold swelling).

Next, the disk having thereon the polymer brush layer swollen with the ionic liquid was immersed in a MEMP-TFSI saturated water (aqueous solution containing 1.5% by mass of HEMP-TFSI, viscosity at 25° C.=0.971 MPa·s), PAO10 (poly-α-olefin, Durasyan 170, from INEOS, viscosity at 25° C.=110 MPa·s), or in water for 30 minutes. The solvent was then removed with use of an air duster, and the thickness of the polymer brush layer was measured with an ellipsometer.

The polymer brush layer after immersed in MEMP-TFSI saturated water was found to have a thickness of 1507 nm (2.10-fold swelling).

The polymer brush layer after immersed in PAO10 was found to have a thickness of 1803 nm (2.51-fold swelling).

The polymer brush layer after immersed in water was found to have a thickness of 790 nm (1.10-fold swelling).

Note that both of MEMP-TFSI saturated water and PAO10 are substantially incompatible with MEMP-TFSI, only demonstrating a solubility of MEMP-TFSI below detection limit (0.01% by mass or below, for example).

The results teach that the polymer brush layer may be suppressed from degrading the degree of swelling, by using a liquid poorly compatible with the swelling liquid in the polymer brush layer, or by using a liquid in which an ionic liquid is dissolved up to saturation, as the liquid to be contacted with the polymer brush layer having been swollen with the ionic liquid.

Test Example 2

As the liquid (swelling liquid) for swelling the polymer brush layer, used was N-(2-methoxyethyl)-N-methylpyrrolidinium bis(trifluoromethanesulfonyl)imide (HEMP-TFSI), which is an ionic liquid. The swelling liquid was coated over the surface of the polymer brush layer of the test specimen 1, to swell the polymer brush layer with the swelling liquid. The test specimen 1 was then evaluated for frictional property, by a frictional test based on a ball-on-disk system. Test equipment used here was TriboLab UMT from Bruker Corporation, and the opposing member used here was a glass lens (diameter=10 mm, radius of curvature=6 mm, SLB-10, from Sigmakoki Co., Ltd.). The frictional test was conducted at a vertical load of 1 to 10 N, a friction speed of 5.2 to 1538 mm/sec, a friction time of 6.5 to 10 minutes, and a test temperature of 23° C., with use of any of lubricating liquids 1 to 3 below, as the lubricating liquid.

Lubricating liquid 1: water (viscosity at 25° C.=0.89 MPa·s)

Lubricating liquid 2: MEN-TFSI saturated water (aqueous solution containing 1.5: by mass of MEMP-TFSI, viscosity at 25° C.=0.971 MPa·s)

Lubricating liquid 3: PAO10 (poly-α-olefin, Durasyan 170, from INEOS, viscosity at 25° C.=109.8 MPa·s)

Results are summarized in FIGS. 2 to 4. FIG. 2 illustrates a Stribeck curve obtained from a frictional test with use of the lubricating liquid 1, under a vertical load of 4 N. FIG. 3 illustrates a Stribeck curve obtained from a frictional test with use of the lubricating liquid 2, under vertical loads of 1 N, 2 N, 4 N and 10 N. FIG. 4 illustrates a Stribeck curve obtained from a frictional test with use of the lubricating liquid 3, under vertical loads of 4N and 10N. In FIGS. 2 to 4, η represents viscosity (MPa·s) of each lubricating liquid, ν represents friction speed, $F_N$ represents vertical load, Coefficient of Friction means frictional force (FX)/vertical load ($F_N$). The frictional force ($F_X$) is an average between values under forward rotation and reverse rotation.

With use of the lubricating liquids 2 and 3, the ionic liquid (MEN-TFSI), which is the swelling liquid in the polymer brush layer, caused phase separation from the lubricating liquids 2 and 3, to form the liquid-liquid phase separation interface. In contrast, with use of the lubricating liquid 1, the lubricating liquid 1 was found to leach into the swelling liquid in the polymer brush layer, without forming the liquid-liquid phase separation interface.

As seen in FIGS. 2 to 4, the coefficient of friction was successfully reduced by using, as the lubricating liquid, the lubricating liquids 2 and 3, which are substantially incompatible with the ionic liquid (ME IP-TFSI) as the swelling liquid in the polymer brush layer, than in a case of using the lubricating liquid 1, proving good lubrication performance.

Test Example 3

As the liquid (swelling liquid) for swelling the polymer brush layer, used was N-(2-methoxyethyl)-N-methylpyrrolidinium bis(trifluoromethanesulfonyl)imide (MEMP-TFSI), which is an ionic liquid.

The swelling liquid was coated over the surface of the polymer brush layer of the test specimen 1, to swell the polymer brush layer with the swelling liquid. The test specimen 1 was then evaluated for frictional property, by a frictional test based on a ball-on-disk system. Test equipment used here was TriboLab UMT from Broker Corporation, the opposing member used here was a glass lens (diameter=10 mm, radius of curvature=6 mm, SLB-10, from Sigmakoki Co., Ltd.). The frictional test was conducted at a vertical load of 4 N or 10 N, a friction speed of 5.2 to 1538 mm/sec, a friction time of 6.5 to 10 minutes, and a test temperature of 23° C., with use of any of lubricating liquids 11 to 13 below, as the lubricating liquid.

Lubricating liquid 11: POE (polyol ester, straight-chain, from JXTG Nippon Oil & Energy Corporation RB74AF, viscosity at 25° C.=38.5 MPa·s)

Lubricating liquid 12: MEMP-TFSI saturated POE (liquid prepared by adding 2% by mass of MEMP-TFSI to POE, followed by mixing and standing still)

Lubricating liquid 13: emulsion having MEMP-TFSI dispersed in POE (containing 2% by mass of MEMP-TFSI, a liquid immediately after adding 2% by mass of MEMP-TFSI to POE, and mixing with a vortex mixer)

Results are summarized in FIG. 5. In FIG. 5, η represents viscosity of the lubricating liquid 11 (MPa·s), ν represents friction speed, $F_N$ represents vertical load, and Coefficient of Friction means frictional force ($F_X$)/vertical load ($F_N$). The frictional force ($F_X$) is an average between values under forward rotation and reverse rotation.

In the cases of using any of the lubricating liquids 11 to 13, the phase separation was found to occur between the ionic liquid (HEMP-TFSI), which is the swelling liquid in the polymer brush layer, and each of the lubricating liquids 11 to 13, forming the liquid-liquid phase separation interface in between.

As illustrated in FIG. 5, all lubricating liquids were found to demonstrate small coefficient of friction, and to excel in the lubrication performance. In particular, use of the emulsion-type lubricating liquid 13 as the lubricating liquid was found to more successfully reduce the coefficient of friction, proving more excellent lubrication performance.

Test Example 4

Block copolymer [diblock copolymer (PLMA-block-PPEGMA) of polylauryl methacrylate (PUMA) and poly (polyethylene glycol methyl ether methacrylate (PPEGMA), number average molecular weight=10500, polydispersity index (PDI)=1.24] was added to PAO10 (poly-α-olefin, viscosity at 25° C.=109.8 MPa·s) or PAO100 (poly-α-olefin, viscosity at 25° C.=2407.8 MPa·s), so as to adjust the content to 2% by mass, and dissolved. Next, 10% by mass of MEMP-TFSI was added, and the mixture was emulsified with use of a homogenizer (Ultra-Turrax T 25B, from IKA), at 10000 rpm for 3 minutes, to prepare lubricating liquids 21 and 22. The lubricating liquid 21 employed PAO10, and the lubricating liquid 22 employed PAO100.

As the liquid (swelling liquid) for swelling the polymer brush layer, used was N-(2-methoxyethyl)-N-methylpyrrolidinium bis(trifluoromethanesulfonyl)imide (MEMP-TFSI), which is an ionic liquid.

The swelling liquid was coated over the surface of the polymer brush layer of the test specimen 3, to swell the polymer brush layer with the swelling liquid. The test specimen 3 was then evaluated for frictional property, by a frictional test based on a ball-on-disk system. Test equipment used here was TriboLab UMT from Bruker Corporation, and the opposing member used here was a glass lens (diameter=10 mm, radius of curvature=6 mm, SLB-10, from Sigmakoki Co., Ltd.). The frictional test was conducted at a vertical load of 0.1 N, 0.5 N, 1 N or 4 N, a friction speed of 5.2 to 1538 mm/sec, a friction time of 6.5 to 10 minutes, and a test temperature of 23° C., with use of any of the aforementioned lubricating liquids 21 to 22, as the lubricating liquid.

Results are summarized in FIG. 6. In FIG. 6, η represents viscosity of PAO10 or PAO100 (MPa·s), ν represents friction speed, $F_N$ represents vertical load, and Coefficient of Friction means frictional force ($F_X$)/vertical load ($F_N$). The frictional force ($F_X$) is an average between values under forward rotation and reverse rotation.

In either case of using the lubricating liquid 21 or 22, the phase separation was found to occur between the ionic liquid (MEMP-TFSI), which is the swelling liquid in the polymer brush layer, and each of the lubricating liquids, forming the liquid-liquid phase separation interface in between.

As illustrated in FIG. 6, both lubricating liquids were found to demonstrate small coefficient of friction, and to excel in the lubrication performance.

Test Example 5

As the liquid (swelling liquid) for swelling the polymer brush layer, used was N-(2-methoxyethyl)-N-methylpyrrolidinium bis(trifluoromethanesulfonyl)imide (MEMP-TFSI), which is an ionic liquid.

The swelling liquid was coated over the surface of the polymer brush layer of the test specimen 4, to swell the polymer brush layer with the swelling liquid. The test specimen 4 was then evaluated for frictional property, by a frictional test based on a ball-on-disk system. Test equipment used here was TriboLab UMT from Bruker Corporation, and the opposing member used here was the test specimen 5 (glass lens having the polymer brush layer formed thereon) or the test specimen 6 (glass lens having the polymer brush layer formed thereon). The frictional test was conducted at a vertical load of 5 N, 10 N, 20 N, 30 N or 40 N, a friction speed of 5.2 to 1538 mm/sec, a friction time of 6.5 to 10 minutes, and a test temperature of 23° C., with use of the lubricating liquid 2 (MEMP-TFSI saturated water (aqueous solution containing 1.5% by mass of MEMP-TFSI), viscosity at 25° C.=0.971 MPa·s), as the lubricating liquid. The phase separation was found to occur between the ionic liquid (MEMP-TFSI), which is the swelling liquid in the polymer brush layer of the test specimen 4 and the test specimen 5, and the lubricating liquid.

A Stribeck curve obtained when using the test specimen 5 as the opposing member is illustrated in FIG. 7, and a Stribeck curve obtained when using the test specimen 6 as the opposing member is illustrated in FIG. 8. In FIGS. 7 and 8, η represents viscosity of the lubricating liquid 2 (MPa·s), ν represents friction speed, $F_N$ represents vertical load, Coefficient of Friction means frictional force ($F_X$)/vertical load ($F_N$). The frictional force ($F_X$) is an average between values under forward rotation and reverse rotation.

As illustrated in FIGS. 7 and 8, formation of the polymer brush layer on the surface of the opposing member was found to more successfully reduce the coefficient of friction, proving more excellent lubrication performance.

Test Example 6

As the liquid (swelling liquid) for swelling the polymer brush layer, used was N-(2-methoxyethyl)-N-methylpyrrolidinium bis(trifluoromethanesulfonyl)imide (MEMP-TFSI), which is an ionic liquid.

The swelling liquid was coated over the surface of the polymer brush layer of the test specimen 7 or the test specimen 8, to swell the polymer brush layer with the swelling liquid. The test specimens were then evaluated for frictional property, by a frictional test based on a ball-on-disk system. Test equipment used here was TriboLab UMT from Bruker Corporation, and the opposing member used here was a steel ball (diameter=10 mm). The frictional test was conducted at a vertical load of 2 to 20 N (incremented stepwise by 2 N every 500 seconds), a friction speed of 10 mm/sec, and a test temperature of 40° C. In the frictional test, lubricating liquids 31 and 32 below were used for the test specimens 7 and 8, respectively.

Lubricating liquid 31: MEMP-TFSI saturated water (aqueous solution containing 1.5% by mass of MEMP-TFSI)

Lubricating liquid 32: Oleic acid-containing, MEMP-TFSI saturated water (aqueous solution containing 1.5%. by mass of MEMP-TFSI, and 0.1% by mass of oleic acid)

Results are summarized in FIGS. 9 and 10. FIG. 9 illustrates the results in a case of using the lubricating liquid 31 as the lubricating liquid, and FIG. 10 illustrates the results in a case of using the lubricating liquid 32. In FIGS. 9 and 10, $F_N$ represents vertical load, and $F_X$ represents frictional force averaged between values under forward rotation and reverse rotation. In either case of using the lubricating liquid 31 or 32, the phase separation was found to occur between the ionic liquid (MEMP-TFSI), which is the swelling liquid in the polymer brush layer, and each of the lubricating liquids, forming the liquid-liquid phase separation interface in between.

As can be understood from the results illustrated in FIGS. 9 and 10, use of the oleic acid-containing lubricating liquid 32 successfully maintained low friction even under stepwise increase of the vertical load.

REFERENCE SIGNS LIST

1: material
10: support
20: brush layer
21: brush-like polymer chain assemblage
22: swelling liquid
30: lubricating liquid
40: liquid-liquid phase separation interface

The invention claimed is:

1. A material comprising:
a support; and
a brush layer containing a brush-like polymer chain assemblage formed of a plurality of polymer chains and a swelling liquid, wherein the brush-like polymer chain assemblage is swollen with the swelling liquid,
the brush layer retaining on a surface a lubricating liquid, and
the swelling liquid contained in the brush layer and the lubricating liquid being phase-separated to form a liquid-liquid phase separation interface in between.

2. The material of claim 1, wherein the lubricating liquid is a liquid incompatible with the swelling liquid, with a solubility of the swelling liquid to the lubricating liquid at 23° C. being 1.00% by mass or smaller.

3. The material of claim 1, wherein affinity of the swelling liquid to the polymer chain assemblage is larger than affinity of the lubricating liquid to the polymer chain assemblage.

4. The material of claim 1, wherein the lubricating liquid contains a liquid 1 which is different from the swelling liquid, and a liquid 2 which is a base liquid of the swelling liquid.

5. The material of claim 4, wherein the lubricating liquid contains the liquid 2 dissolved up to saturation in the liquid 1.

6. The material of claim 4, wherein the liquid 1 is incompatible with the swelling liquid, and
the lubricating liquid is an emulsion having the liquid 2 dispersed in the liquid 1.

7. The material of claim 1, wherein the lubricating liquid contains a friction modifier.

8. The material of claim 1, wherein the polymer chains that form the polymer chain assemblage are immobilized on the support, to form a polymer brush on the support.

9. The material of claim 1, wherein the polymer chain assemblage has a bottle-brush structure in which the plurality of polymer chains that form the polymer chain assemblage are bound as side chains to a polymer chain.

10. The material of claim 1, being a sliding member.

11. A sliding system comprising a member with a sliding face, and an opposing member arranged opposed to the sliding face of the member, the sliding system
having, on the member with the sliding face, a brush layer containing a brush-like polymer chain assemblage formed of a plurality of polymer chains and a swelling liquid, wherein the brush-like polymer chain assemblage is swollen with the swelling liquid, and
retaining, between the brush layer and the opposing member and on the brush layer, a lubricating liquid, and,
the swelling liquid contained in the brush layer and the lubricating liquid being phase-separated to form a liquid-liquid phase separation interface in between.

12. The sliding system of claim 11, having, on the surface of the opposing member, a brush-like polymer chain assemblage layer formed of a plurality of polymer chains containing a swelling liquid, or a layer with a polymer network structure layer containing the swelling liquid.

13. The sliding system of claim 11, wherein the lubricating liquid is a liquid incompatible with the swelling liquid, with a solubility of the swelling liquid to the lubricating liquid at 23° C. being 1.00% by mass or smaller.

* * * * *